(12) United States Patent
Yao et al.

(10) Patent No.: US 11,714,250 B2
(45) Date of Patent: Aug. 1, 2023

(54) WELDING STRUCTURE FOR OPTICAL MODULE AND APPLICATION THEREOF

(71) Applicant: Ningbo Sunny Opotech Co., Ltd., Zhejiang (CN)

(72) Inventors: Lifeng Yao, Zhejiang (CN); Shuijia Chu, Zhejiang (CN); Chunmei Liu, Zhejiang (CN); Chunqi Yan, Zhejiang (CN); Wangzhen Zhang, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 347 days.

(21) Appl. No.: 16/619,128

(22) PCT Filed: Jun. 8, 2018

(86) PCT No.: PCT/CN2018/090397
§ 371 (c)(1),
(2) Date: Dec. 4, 2019

(87) PCT Pub. No.: WO2018/224031
PCT Pub. Date: Dec. 13, 2018

(65) Prior Publication Data
US 2020/0116970 A1   Apr. 16, 2020

(30) Foreign Application Priority Data
Jun. 8, 2017   (CN) .......................... 201710427335.5

(51) Int. Cl.
*G02B 7/02*   (2021.01)
*G02B 7/09*   (2021.01)
*G02B 13/00*   (2006.01)

(52) U.S. Cl.
CPC .............. *G02B 7/021* (2013.01); *G02B 7/09* (2013.01); *G02B 13/0045* (2013.01)

(58) Field of Classification Search
CPC ...... G02B 7/021; G02B 7/09; G02B 13/0045; G02B 7/026
See application file for complete search history.

(56) References Cited

U.S. PATENT DOCUMENTS

| 6,603,612 B2 * | 8/2003 | Nakano ..................... G11B 7/22 359/821 |
| 2008/0100934 A1 * | 5/2008 | Webster ................. G02B 7/021 359/830 |

(Continued)

FOREIGN PATENT DOCUMENTS

| CN | 101859012 | 10/2010 |
| CN | 102331612 | 1/2012 |

(Continued)

OTHER PUBLICATIONS

Machine Translation of KR20130035522A (Year: 2013).*

(Continued)

*Primary Examiner* — Darryl J Collins
*Assistant Examiner* — Matthew Y Lee
(74) *Attorney, Agent, or Firm* — Wenderoth, Lind & Ponack, L.L.P.

(57) ABSTRACT

Disclosed is a welding structure (20) for an optical module (300) and an application thereof, wherein the optical module (300) comprises at least a first module assembly and at least a second module assembly, the welding structure (20) comprises at least a first welding part (21) and at least a second welding part (22), wherein the welding part (21) is provided on the first module assembly and the second welding part (22) is provided on the second module assembly, and after the first welding part (21) is welded to the second welding part (22), the first module assembly and the second module assembly are fixed relative to each other.

18 Claims, 15 Drawing Sheets

(56) References Cited

U.S. PATENT DOCUMENTS

| | | | |
|---|---|---|---|
| 2010/0140459 A1 | 6/2010 | Tatsuzawa et al. | |
| 2010/0254027 A1* | 10/2010 | Genda | G02B 13/0035 |
| | | | 359/738 |
| 2014/0036146 A1 | 2/2014 | Choi | |
| 2020/0116970 A1 | 4/2020 | Yao et al. | |

FOREIGN PATENT DOCUMENTS

| | | | | |
|---|---|---|---|---|
| CN | 204697151 | | 10/2015 | |
| CN | 105445889 | | 3/2016 | |
| CN | 205208078 | | 5/2016 | |
| CN | 205407980 | * | 7/2016 | ............ H04N 5/225 |
| CN | 205407986 | | 7/2016 | |
| CN | 205610755 | | 9/2016 | |
| CN | 207731004 U | * | 8/2018 | ............ G02B 7/021 |
| CN | 109031572 | | 12/2018 | |
| CN | 208621811 | | 3/2019 | |
| EP | 3 376 751 | | 9/2018 | |
| EP | 3 385 766 | | 10/2018 | |
| EP | 3 637 754 | | 4/2020 | |
| JP | 2008-90180 | | 4/2008 | |
| JP | 2010-139625 | | 6/2010 | |
| JP | 2010139625 | * | 6/2010 | ............ G02B 7/02 |
| JP | 2010-243619 | | 10/2010 | |
| KR | 20130035522 A | * | 4/2013 | ............ G02B 7/02 |
| WO | 2011/080952 | | 7/2011 | |
| WO | 2017/080526 | | 5/2017 | |

OTHER PUBLICATIONS

Machine Translation of CN-207731004-U (Year: 2018).*
International Search Report dated Aug. 29, 2018 in International (PCT) Application No. PCT/CN2018/090397.
Office Action dated Jan. 28, 2022 in corresponding European Patent Application No. 18814071.9.

* cited by examiner

WELDING STRUCTURE FOR OPTICAL MODULE AND APPLICATION THEREOF

FIELD OF THE PRESENT INVENTION

The present invention relates to field of optical module, and more particularly to an optical module configured with a multi-group lens assembly fixed by welding, wherein a welding structure is used to fix the multi-group lens assembly, thereby improving the stability of the optical module.

BACKGROUND OF THE PRESENT INVENTION

Optical modules are widely used in electronic products for camera, monitoring or the like. The optical module comprises a circuit board assembly, a filter, and a lens assembly, wherein the circuit board assembly comprises a circuit board main body, a photosensitive chip, a plurality of electronic elements, and a holder, wherein the photosensitive chip, the electronic elements, and the holder are mounted on the circuit board main body respectively and the filter and the lens assembly are mounted on the holder respectively and located at a photosensitive path of the photosensitive chip.

Conventionally, whether the photosensitive chip is mounted on the circuit board main body, or the holder is mounted on the circuit board main body, or the lens assembly is mounted in a lens barrel, or the lens barrel is mounted on the holder, they are all mounted fixedly and adhesively by other medium, for example, glue. When a medium of the same type as glue is used during mounting, since the thermal expansion or contraction coefficient of the medium is different from that of the material of a surface of a structure required to be fixed, the structure which is relatively fixed by glue is easily deformed when it is cooled after being heated, thereby affecting the performance of the optical module. In addition, the deformation often occurs after the optical module is assembled. In particular, when the optical module is mounted on an electronic product, the electronic product is often switched between an on state and an off state. Moreover, the electronic product may generate heat when it is in the on state, and temperature difference may occur when the electronic product is switched to the off state, at this time, the structure which is fixed by glue in the optical module may be deformed. In addition, since a certain thickness of glue is formed between the surfaces of the structures fixed by glue where glue is used for fixing, a certain gap needs to be pre-set between two structure surfaces fixed by glue in design, which not only leads to an enlarged size of the finally formed optical module, but also increases the difficulty of design.

The lens assembly is an important component of the optical module and has a direct influence on the imaging quality of the optical module, especially for the lens assembly in the optical module.

With the continuous development of intellectualization, the requirements for optical modules are improved increasingly, such as the increasing demand for high pixels in imaging, which also increases the number of lenses for the lens assembly of the optical modules, such as up to 5 to 6 lenses.

Ensuring the consistency of optical axes, that is, ensuring the consistency of central axes of various lenses, and the consistence with a central axis of the photosensitive chip is the basis for ensuring good imaging quality. Generally, for a conventional lens assembly, a plurality of lenses are assembled into a lens barrel successively. During assembling, inevitably, there may be a certain error when each lens is assembled into the lens barrel. Finally, a cumulative error is formed between the entire lenses and the lens barrel, which is an assembly error of a single lens assembly. It can be seen easily therefrom that if the number of lenses is larger, the cumulative error may be larger, so that the overall quality of the lens assembly is poorer, and the yield during lens assembly production is lower.

On the other hand, for a conventional lens assembly, a plurality of lenses are assembled in the same lens barrel. Relative positions between the lenses are substantially determined and cannot be adjusted. Once the lenses are assembled in the lens barrel, the quality of the lens assembly is determined. Therefore, it requires higher processing precision for the lens barrel and the lenses.

It is worth mentioning that for a lens assembly with fewer lenses, the assembly error of the lenses has less influence, and therefore, the entire lens assembly may have a greater advantage for production and assembly of the module. However, when the number of lenses increases, the more the lenses, the more serious the problem caused by the lens assembly. As such, it is more urgent to improve the lens assembly. Therefore, it is an important issue required to be studied about how to ensure good imaging quality and production yield on the basis of providing high pixels through a plurality of lenses.

It is also worth mentioning that the lens of the lens assembly and an assembly relationship between the lenses and the lens barrel have a direct influence on the quality of the lens assembly, and the optical module, especially the optical module used in some smart devices, such as a smart phone, is relatively small. Therefore, we need to account for how to study out a lens assembly suitable for practical production application in combination with the existing device requirements by making full use of the structure of the lens assembly.

SUMMARY OF THE PRESENT INVENTION

The present invention provides a welding structure for an optical module and an application thereof, wherein after a first module assembly and a second module assembly of the optical module are relatively fixed by means of the welding structure, the first module assembly and the second module assembly do not produce in a large relative displacement due to thermal expansion, and when the environment where the first module assembly and the second module assembly and the welding structure are located is restored, the displacement between the first module assembly and the second module assembly due to thermal expansion is also eliminated, thereby enabling the multi-group lens assembly to maintain a stable optical performance.

The present invention provides a welding structure for an optical module and an application thereof, wherein the optical module has a smaller size.

The present invention provides a welding structure for an optical module and an application thereof, wherein before the first module assembly and the second module assembly of the optical module are relatively fixed, the optical module can be aligned in a manner by which the relative position between the first module assembly and the second module assembly is adjusted.

To achieve at least one object of the present invention, the present invention provides a welding structure for an optical module, wherein the optical module comprises at least a first module assembly and at least a second module assembly, the welding structure comprises at least a first welding part and at least one second welding part, the first welding part is provided on the first module assembly, the second welding part is provided on the second module assembly, and after the first welding part is welded to the second welding part, the first module assembly and the second module assembly are fixed relative to each other.

To achieve at least one object of the present invention, the present invention provides a multi-group lens assembly comprising:

at least a first group unit that includes a first supporting component and a first group lens, wherein the first group lens is mounted on the first supporting component;

at least a second group unit that includes a second supporting component and a second group lens, wherein the second group lens is mounted on the second supporting component, and when the first group unit is mounted on the second group unit, the first supporting component is supported by the second supporting component; and a welding structure that includes at least a first welding part and at least a second welding part that is welded and fixed to the first welding part, wherein the first welding part and the second welding part are provided on the first supporting component and the second supporting component, respectively.

According to an embodiment of the present invention, the first supporting component comprises a first main body and an outer extension table extending outwardly from the first main body, wherein the outer extension table has a first outer bottom face, and the first welding part is provided on the first outer bottom face; and the second supporting component comprises a second main body and a supporting table extending from the second main body, wherein the supporting table has an outer top face for supporting the outer extension table of the first supporting component, and the second welding part is provided on the outer top face of the support table.

According to an embodiment of the present invention, the first supporting component comprises a first main body and an outer extension table extending outwardly from the first main body, wherein the outer extension table has a first outer side face, the first welding part is provided on the first outer side face of the outer extension table; and the second supporting component comprises a second main body and a supporting table extending from the second main body, wherein the supporting table has a second outer side face for supporting the outer extension table of the first supporting component, and the second welding part is provided on the second outer side face of the supporting table.

According to an embodiment of the present invention, the first welding part and the second welding part are respectively embedded into the first supporting component and the second supporting component.

According to an embodiment of the present invention, at least one selected from the first welding part and the second welding part is implemented as an enclosed annular shape.

According to an embodiment of the present invention, at least one selected from the first welding part and the second welding part is implemented to be composed of a plurality of parts that are separated.

According to an embodiment of the present invention, the first welding part and the second welding part are implemented to have the same structure.

According to an embodiment of the present invention, the first welding part comprises a first embedding portion and a first connecting portion connected to the first embedding portion, and when the first welding part is embedded into the first supporting component, the first embedding portion is embedded into the first supporting component and the first connecting portion forms a first exposed surface.

According to an embodiment of the present invention, the second welding part comprises a second embedding portion and a second connecting portion connected to the second embedding portion, when the second welding part is embedded into the second supporting component, the second embedding portion is embedded into the second supporting component and the second connecting portion forms a second exposed surface, and the first exposed surface of the first connecting portion and the second exposed surface of the second connecting portion are bonded to each other after the first welding part is welded to the second welding part.

According to an embodiment of the present invention, the outer extension table has an upper side face opposite to the outer bottom face and a welding port, wherein the welding port extends from the outer bottom face of the outer extension table to the upper side face of the outer extension table.

According to an embodiment of the present invention, the supporting table has a third outer side face opposite to the second outer side face and a welding port, wherein the welding port extends from the second outer side face to the third outer side face.

According to an aspect of the present invention, in order to achieve at least one of the above objects, the present invention provides an optical module comprising:

a circuit board assembly; and a multi-group lens assembly as described above that is provided on the circuit board assembly.

According to an aspect of the present invention, in order to achieve at least one of the above objects, the present invention provides an optical module comprising:

a circuit board assembly;

a lens assembly supporting element that is provided on the circuit board assembly;

a lens assembly that is mounted to the lens assembly supporting element; and a welding structure that comprises at least a first welding part and at least a second welding part, wherein the first welding part is provided on the lens assembly supporting element, and the second welding part is provided on the lens assembly in a manner by which the second welding part is welded and fixed to the first welding part.

According to an embodiment of the present invention, the lens assembly comprises a set of lenses and a mounting body, wherein the lenses is mounted to the mounting body, the mounting body has an outer wall, the first welding part is provided on the outer wall of the mounting body, the lens assembly supporting element has an inner wall, and the second welding part is provided on the inner wall of the lens assembly supporting element in a manner by which the second welding part is capable of being welded and fixed to the first welding part.

According to an aspect of the present invention, in order to achieve at least one of the above objects, the present invention provides an optical module comprising:

a circuit board assembly;

a lens assembly supporting member that is provided on the circuit board assembly;

a lens assembly that is mounted to the lens assembly supporting member; and a welding structure that comprises at least a first welding part and at least a second welding part, wherein the first welding part is provided on the lens assembly supporting member, and the second welding part is provided on the circuit board assembly in a manner by which the second welding part is welded and fixed to the first welding part.

According to an aspect of the present invention, in order to achieve at least one of the above objects, the present invention provides an optical module comprising:
a circuit board assembly;
a driving element that is provided on the circuit board assembly;
a lens assembly that is drivably supported on the driving element; and
a welding structure that comprises at least a first welding part and at least a second welding part, wherein the first welding part is provided on the driving element, and the second welding part is provided on the circuit board assembly in a manner by which the second welding part is welded and fixed to the first welding part.

According to an aspect of the present invention, in order to achieve at least one of the above objects, the present invention provides an electronic device comprising:
a device body; and
the optical module as described above that is provided on the device body.

According to an aspect of the present invention, in order to achieve at least one of the above objects, the present invention provides a manufacturing process for an optical module, wherein the process comprises steps of:
mounting a first module assembly provided with a first welding part to a second module assembly provided with a second welding part; and
welding the first welding part and the second welding part through laser welding so as to fix the first module assembly and the second module assembly relatively.

According to an embodiment of the present invention, the first module assembly and the second module assembly are implemented as at least two group units selected from a multi-group lens assembly, a lens assembly and a lens assembly supporting element, a lens assembly supporting element and a photosensitive assembly, a driving element and a photosensitive assembly, respectively.

According to an embodiment of the present invention, the first module assembly and the second module assembly are implemented as at least two group units of a multi-group lens assembly respectively, and before the step of welding, the manufacturing process for the optical module further comprises the step of:
aligning the at least two group units.

According to an embodiment of the present invention, the step of mounting comprises: embedding a first embedding portion of the first welding part and a second embedding portion of the second welding part into the first module assembly and the second module assembly, respectively; and
positioning a first module assembly provided with a first welding part on a second module assembly provided with a second welding part to correspond a first connecting portion of the first welding part to a second connecting portion of the second welding part.

DETAIL DESCRIPTION OF THE PRESENT INVENTION

Figure 1:
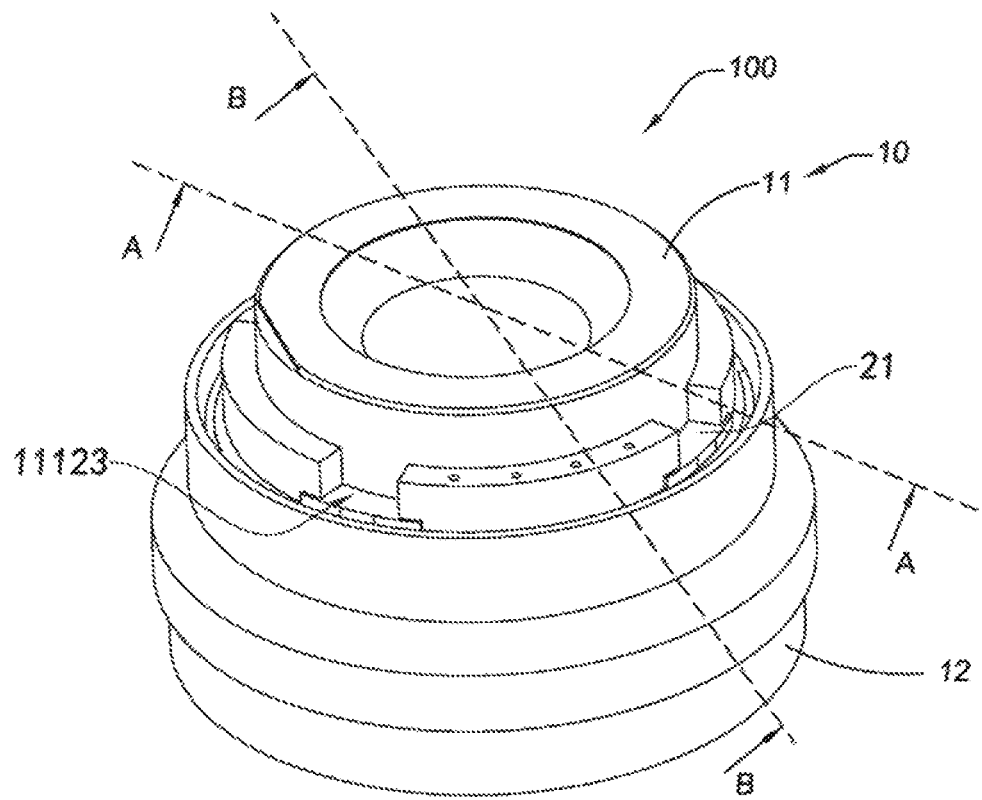
FIG. 1 is a schematic diagram of a multi-group lens assembly formed by welding and fixing according to the present invention.

The following description is used to disclose the present invention to enable those skilled in the art to implement the present invention. The preferred embodiments in the following description are by way of example only, and other obvious variations will occur to those skilled in the art. The basic principles of the present invention as defined in the following description may be applied to other embodiments, modifications, improvements, equivalents, and other technical solutions without departing from the spirit and scope of the present invention.

It should be understood by those skilled in the art that in the disclosure of the present invention, the orientation or positional relationship indicated by terms "longitudinal", "transverse", "upper", "lower", "front", "back", "left", "right", "vertical", "horizontal", "top", "bottom", "inside", "outside", and the like is based on the orientation or positional relationship shown in the drawings, which is merely for the convenience of describing the present invention and for the simplification of the description, and not to indicate or imply that the device or element referred to must have a specific orientation, be constructed and operated in a specific orientation. Therefore, the above terms shall not be construed as a limitation of the present invention.

The present invention provides an electronic device, an optical module, and a welding structure for the optical module, wherein the optical module includes at least a first module assembly, at least a second module assembly, and at least one welding structure which includes at least a first welding part and at least a second welding part, wherein the first welding part is provided on the first module assembly and the second welding part is provided on the second module assembly, and preferably, the first welding part is embedded into the first module assembly and the second welding part is embedded into the second module assembly. It can be understood by those skilled in the art that the first welding part and the second welding part may be provided on the first welding part and the second welder respectively by adhesion or other means, and the present invention is not limited in this aspect. In order to enable those skilled in the art to understand the present invention, in the following embodiments of the present invention, an example that the first welding part and the second welding part are respectively implemented to be embedded into the first module assembly and the second module assembly is merely used for description. The first module assembly and the second module assembly are stably connected by a welding structure formed by welding the first welding part and the second welding part.

It is worth mentioning that in the present invention, the way of welding the first welding part and the second welding part includes, but not limited to, laser welding, ultrasonic welding, or the like.

It is further worth mentioning that in another embodiment of the present invention, the first welding part and the second welding part may be formed by integrally extending from the first module assembly and the second module assembly, respectively, and the present invention is not limited in this aspect. Moreover, in order to enable those skilled in the art to understand the present invention, in the embodiment of the present invention, an example that the first welding part and the second welding part are provided on the first module assembly and the second module assembly respectively is merely used for description.

It can be understood by those skilled in the art that in other embodiments of the present invention, the welding structure may include a third welding structure and a fourth welding structure, and the optical module may include a third module assembly or a fourth module assembly, wherein the third welding part may be provided on the second module assembly and the fourth welding part may be provided on the third module assembly, so that the third module assembly may be connected to the second module assembly by welding the third welding part and the fourth welding part.

It is worth mentioning that the third welding structure may also be provided on the third module assembly, and the fourth welding part is provided on the fourth module assembly, so that the third module assembly and the fourth module assembly are relatively fixed by welding the third welding part and the fourth welding part.

The first module assembly and the second module assembly may be implemented as, but not limited to, a lens assembly and a lens barrel, a lens barrel and a circuit board assembly, a motor and a photosensitive assembly, and two group units in a multi-group lens assembly, or the like. In order to enable those skilled in the art to understand the present invention, in the following embodiments, two group units in a multi-group lens assembly are taken as an example for description firstly. It can be understood by those skilled in the art that the welding structure of the present invention may be used to connect two elements in the optical module, which need to be fixed in the optical module, and the present invention is not limited in this aspect. The multi-group lens assembly refers to the lens assembly used in the optical module being formed by combining two or more sets of separated lens assemblies (referred to as group units in the following embodiments of the present invention).

A conventional lens assembly, especially those used in optical modules, always has relatively stable and unitary structures and is formed by assembling a plurality of lenses into a lens barrel. As previously described, when less lenses are used, such as two or three lenses, an assembly error of this structure is relatively small. With the requirements of high pixel and high image quality for lens assemblies and optical modules, the number of lenses increases, a cumulative error increases, and therefore, the structure of the conventional lens assembly is unsuitable for the requirements for lens assemblies and optical modules. Accordingly, a multi-group lens assembly is provided according to the present invention, wherein an integral lens assembly is formed by assembling a plurality of group units, so that there are less lenses in each group unit, and the assembly error of each unit is small, while the total number of lenses of the multi-group lens assembly formed by various group units is large, so that higher pixels may be provided and a cumulative error is small. In addition, the group units may be assembled by using Active Alignment (AA) during forming the multi-group lens assembly, so that the relative error between the group units is reduced, thereby resulting in better optical consistency of the multi-group lens assembly. Moreover, the group units are assembled to each other in a cooperated manner by an assembling structure, so that the group units are assembled stably to form the multi-group lens assembly, and external stray light may be blocked from entering the multi-group lens assembly in the cooperation manner, thereby avoiding interference with an optical system of the multi-group lens assembly. Furthermore, in some implementations, the group units are assembled and fixed quickly and stably by a welding structure 20, thereby improving the production efficiency.

Referring to FIG. 1 to FIG. 12, a multi-group lens assembly 100 includes a plurality of group units 10 and at least a welding structure 20 and is adapted for a lens assembly of a plurality of lenses, such as 2, 3 or more lenses.

The multi-group lens assembly 100 is adapted for being assembled to form an optical module 300 and is particularly adapted for being assembled to form the optical module 300 with high pixels.

The multi-group lens assembly 100 includes at least two group units 10, each of which together constitutes an overall optical system of the multi-group lens assembly 100. That is, the optical system of the plurality of lenses is implemented by combining at least two of the group units, instead of being implemented by a separate lens assembly like a conventional integrated lens assembly.

It is worth mentioning that the lenses in the group units of the multi-group lens assembly 100 may be allocated and combined as required differently. In this embodiment of the present invention, only one of them is selected for description. It can be understood by those skilled in the art that the number and manner of allocation of the lenses is not a limitation of the present invention.

More specifically, the multi-group lens assembly 100 includes two group units, that is, a first group unit 11 and a second group unit 12, respectively. When the first group unit 11 and the second group unit 12 constitute an integral lens assembly, the first group unit 11 is located above the second group unit 12, and optical axes of the first group unit 11 and the second group unit 12 are consistent. That is, in the embodiment of the present invention, the optical system of the multi-group lens assembly 100 is jointly constituted by two optical systems each corresponding to the first group unit 11 and the second group unit 12 respectively. That is, to a certain extent, when the first group unit 11 and the second group unit 12 are each independently present, the function of a complete lens assembly cannot be implemented, and when the first group unit 11 and the second group unit 12 cooperate with each other, they constitute a complete lens assembly which may meet the requirements for imaging quality. Further, the first group unit 11 includes a first supporting component 111 and at least a first group lens 112 which is mounted to the first supporting component 111 to facilitate constitution of a separate component.

The second group unit 12 includes a second supporting component 121 and at least a second group lens 122 which is mounted to the second supporting component 121 to facilitate constitution of another separate component.

The first supporting component 111 is provided above the second supporting component 121 such that directions of light paths of the first group unit 11 and the second group unit 12 are consistent.

In the embodiment of the present invention, the first welding part 21 is provided on the first supporting component 111, and preferably, the first welding part 21 is embedded into the first supporting component 111. The second welding part 22 is provided on the second supporting component 121, and preferably, the second welding part 22 is embedded into the second supporting component 121. When the first group unit 11 is relatively fixed to the second group unit 12, the first supporting component 111 is supported on the second supporting component 121 and the first welding part 21 is supported on the second welding part 22. Further, after aligning the first group unit 11 and the second group unit 12, the first supporting component 111 of the first group unit 11 and the second supporting component 121 of the second group unit 12 can be relatively fixed to each other by welding the first welding part 21 and the second welding part 22 through laser welding.

It is worth mentioning that, in case of fixing in the above manner, since the first welding part 21 and the second welding part 22 are preferably made of a metal material, when the multi-group lens assembly 100 is provided in the optical module 300 and the optical module 300 is often in a harsh environment (such as but not limited to baking, high temperature and high humidity), the relative position between the first group unit 11 and the second group unit 12 would not have a large displacement due to uneven thermal expansion, so that the multi-group lens assembly 100 can maintain stable optical performance.

It is also worth mentioning that in the conventional integrated lens assembly, lenses are successively mounted in a lens barrel, the range in which the lens can be adjusted is small, and once the lens is fixed, positions of the lens and the lens barrel are fixed relatively. When all the lenses are assembled, a cumulative error of the entire lens assembly is determined and cannot be adjusted. In the present invention, the first group unit 11 and the second group unit 12 each may be constituted independently, without affecting each other, and when the first group unit 11 and the second group unit 12 are assembled into an integral lens assembly, the first group unit 11 and the second group unit 12 may be adjusted relatively, so that the lens assembly may be aligned further so as to reduce the overall error. In particular, it is possible to adjust in different directions in a stereoscopic space, such as adjustment in six axis directions.

The first supporting component 111 includes a first main body 1111 and an outer extension table 1112 which extends outwardly from the first main body 1111. In particular, the outer extension table 1112 extends integrally outwardly from the first body 1111 in a horizontal manner to form an annular brim structure, for example, formed integrally by means of a mold.

In this embodiment of the present invention, the outer extension table 1112 is provided at a middle position of outer part of the first main body 1111 and divides the first main body 1111 into two parts, a part located above the outer extension table 1112 and the other part located below the outer extension table 1112, and after the first group unit 11 and the second group unit 12 are assembled, the first main body 1111 is located above the outer extension table 1112.

The outer extension table 1112 may be set in different heights, for example, in some embodiments, a relatively small height is provided such that a top face of the outer extension table 1112 is lower than a top end of the first main body 1111. For example, in some embodiments, a relatively large height is provided such that the top face of the outer extension table 1112 coincides with the top end of the first main body 1111, thereby resulting in different shapes of upper portion of the multi-group lens assembly 100.

The first main body 1111 has a first accommodating cavity 11111, a first upper light through hole 11112, and a first lower light through hole 11113. The first group lens 112 is accommodated in the first accommodating cavity 11111.

The first upper light through hole 11112 is located in an upper part of the first main body 1111 for communicating with the outside, so that light enters the first group unit 11, that is, external light reaches the first group lens 112 within the first accommodating cavity 11111.

The first lower light through hole 11113 is located in a lower part of the first main body 1111 and communicates with the second group unit 12, so that light passing through the first group unit 11 reaches the second group unit 12.

The second supporting component 121 includes a second main body 1211 and a supporting table 1212 extending integrally from the second main body 1211, wherein the first group unit 11 and the second group unit 12 are combined, the outer extension table 1112 of the first supporting component 111 is supported on the supporting table 1212 of the second supporting component 121.

Referring to FIG. 3 to FIG. 11, in an embodiment of the present invention, the first welding part 21 is provided on the outer extension table 1112 and the second welding part 22 is provided on the supporting table 1212. After the first group unit 11 and the second group unit 12 are aligned, the first group unit 11 and the second group unit 12 may be fixed relatively just by welding the first welding part 21 and the second welding part 22.

The second main body 1211 has a second accommodating cavity 12111, a second upper light through hole 12112, and a second lower light through hole 12113. The second group lens 122 is accommodated in the second accommodating cavity 12111.

The second upper light through hole 12112 is located in an upper part of the second body 1211 for communicating with the first group unit 11, so that light passing through the first group unit 11 reaches the second group unit 12.

The second lower light through hole 12113 is located in a lower portion of the second body 1211 and communicates with the outside, so that light passing through the second group unit 12 reaches the outside, for example, reaching a photosensitive element of the optical module 300, thereby the first group unit 11 and the second group unit 12 forming a complete optical system.

In this embodiment of the present invention, the first group unit 11 includes at least a first light path element 113 which is provided at a position adjacent to the lens so as to facilitate formation of a predetermined light pathway on the lens. For example, the first light path element 113 may be a spacer that blocks light at an edge of the lens so as to form the predetermined light pathway at a central position of the lens. The first light path element 113 may be a coating that blocks light and covers the edge of the lens so as to form the predetermined light pathway at the central position of the lens. In other words, the light path element is provided in cooperation with the lens so as to facilitate formation of the predetermined light pathway on the lens.

The second group unit 12 includes at least a second light path element 123 which is provided at a position adjacent to the lens so as to facilitate formation of a predetermined light pathway on the lens. For example, the second light path element 123 may be a spacer that blocks light at the edge of the lens so as to form a predetermined light pathway at the central position of the lens. The second light path element 123 may be a coating that blocks light and covers the edge of the lens so as to form the predetermined light pathway at the central position of the lens.

More specifically, in the embodiment of the present invention, the outer extension table 1112 of the first supporting component 111 further has a first outer side face 11121 and an outer bottom face 11122. An upper portion of the support table 1212 is formed with a groove for accommodating the outer extension table 1112 of the first supporting component 111 when the first group unit 11 is mounted to the second group unit 12. The supporting table 1212 has a second outer side face 12121 and an outer top face 12122. When the first supporting component 111 is mounted to the second supporting component 121, the outer extension table 1112 of the first supporting component 111 is supported above the support table 1212 of the second supporting component 121, the first outer side face 11121 of the outer extension table 1112 and the second outer side face 12121 of the support table 1212 are opposite to each other, and the outer bottom face 11122 of the outer extension table 1112 and the outer top face 12122 of the support table 1212 are opposite to each other.

Figure 5:
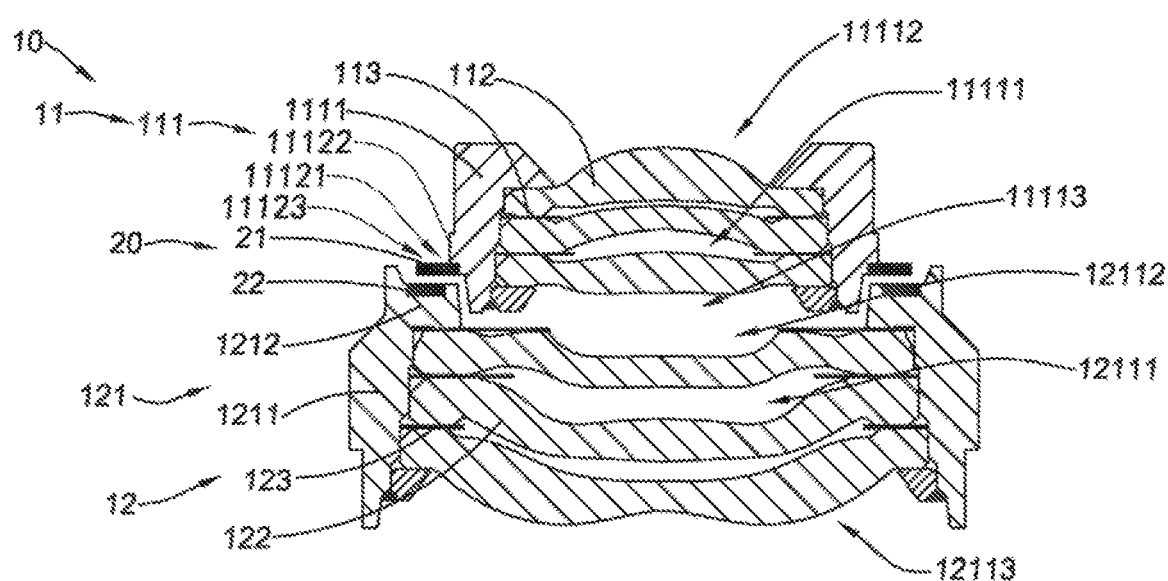
FIG. 5 is a sectional view of a multi-group lens assembly, formed by welding and fixing, before being fixed by welding according to the first embodiment of the present invention.
Figure 6A:
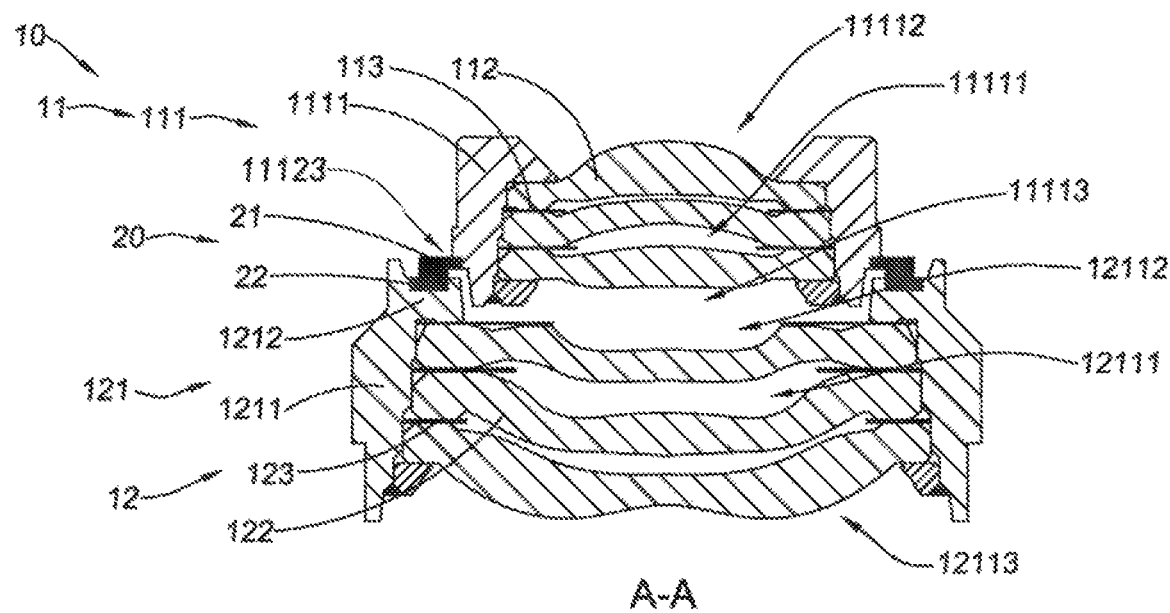
FIG. 6A is a sectional view of the multi-group lens assembly, formed by welding and fixing, along the A-A direction after being welded according to the first embodiment of the present invention.
Figure 6B:
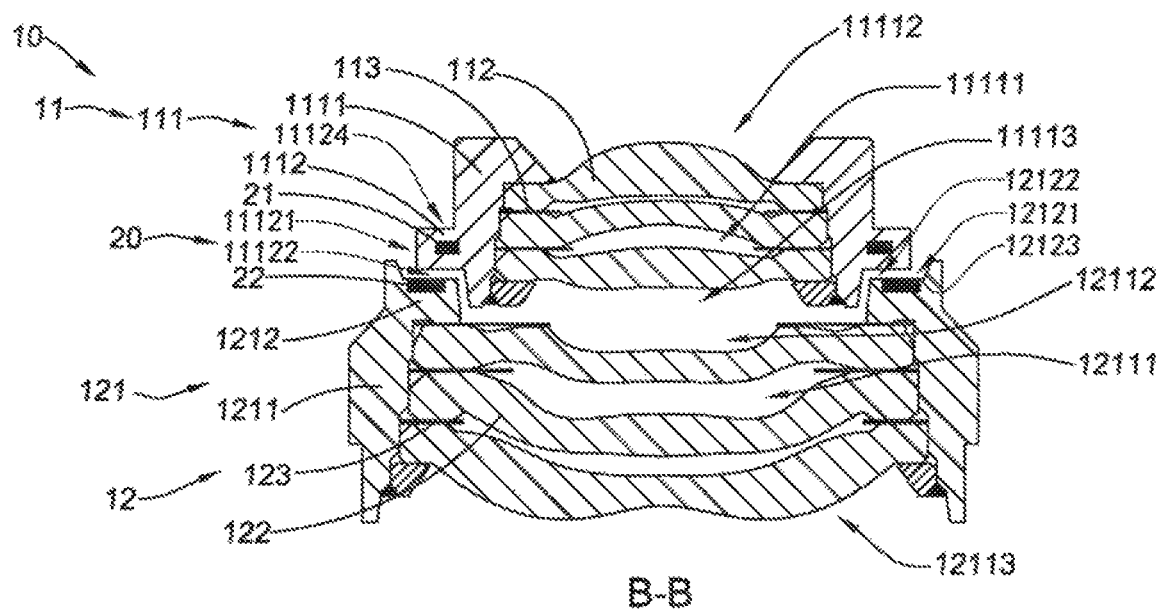
FIG. 6B is a sectional view of the multi-group lens assembly, formed by welding and fixing, along the B-B direction after being welded according to the first embodiment of the present invention.

It is worth mentioning that the first group unit 11 may be adjusted relative to the second group unit 12 before the first welding part 21 is welded to the second welding part 22, so that the optical module formed by the first group unit 11 and the second group unit 12 can be aligned before the first welding part 21 is welded to the second welding part 22, that is, the first group unit 11 can be relatively adjusted within the groove of the supporting table 1212. Referring to FIG. 5, FIG. 6A, and FIG. 6B, in the multi-group lens assembly 100 of a first embodiment of the present invention, the first welding part 21 is provided on the outer bottom face 1112 of the outer extension table 11122, at this time, the second welding part 22 is provided on the outer top face 12122 of the supporting table 1212 correspondingly, and when the first group unit 11 may be fixed relative to the second group unit 12, the first group unit 11 and the second group unit 12 may be fixed relatively just by welding the first welding part 21 and the second welding part 22 upwardly and downwardly.

Preferably, the outer extension table 1112 of the first supporting component 111 further has at least a welding port 11123. After the first welding part 21 is provided on the first supporting component 111, a portion of the first welding part 21 is exposed by the welding port 11123. When the first welding part 21 and the second welding part 22 are welded and fixed through laser welding, a welding head of a welding tool may perform operations on the first welding part 21 through the welding port 11123.

Specifically, the outer extension table 1112 further has an upper side face 11124 opposite to the outer bottom face 11122. The welding port 11123 extends from the upper side face 11124 to the outer bottom face 11122, so that the first welding part 21 provided on the outer extension table 1112 is partially exposed, so as to facilitate the welding head of the welding tool performing a welding operation on the first welding part 21 through the welding port 11123.

Figure 7:
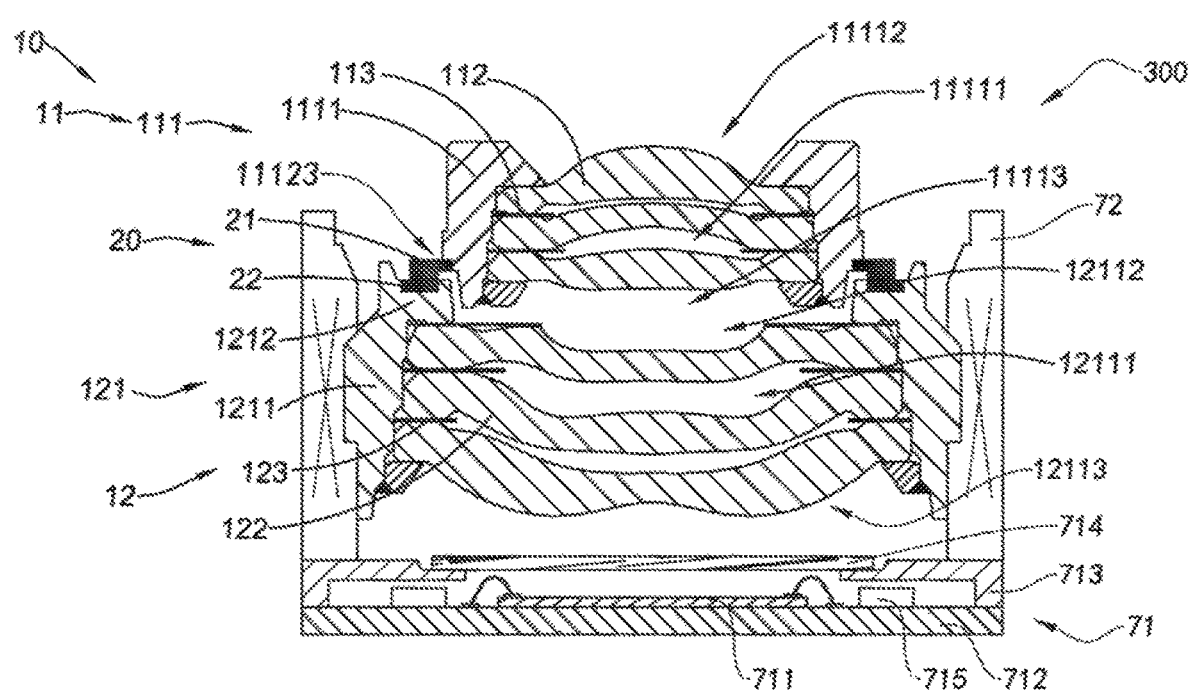
FIG. 7 is a schematic structural diagram of the optical module according to the first embodiment of the present invention.
Figure 8A:
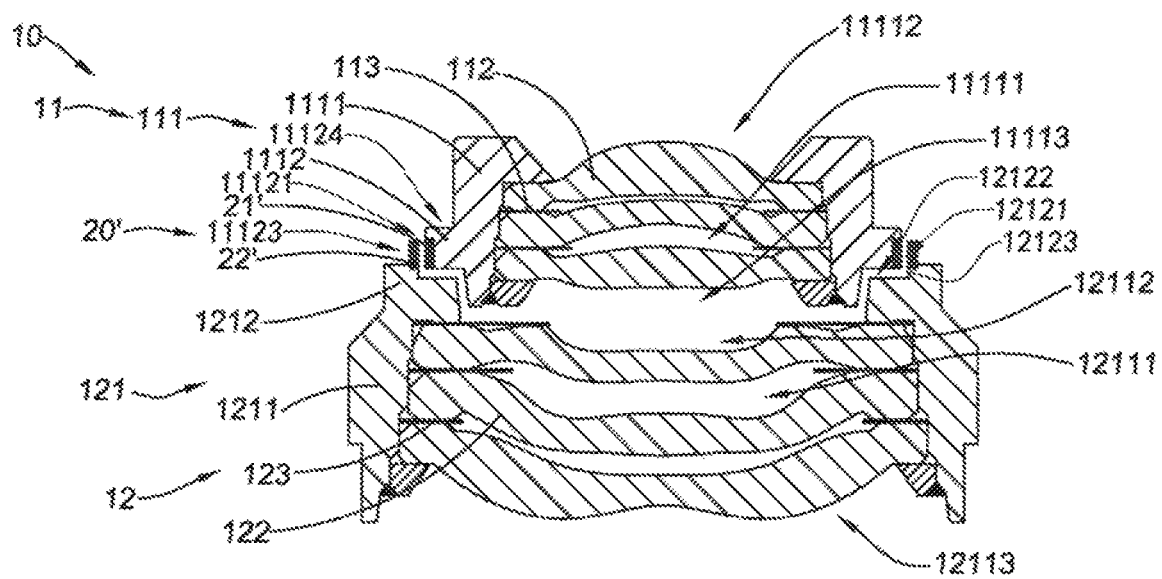
FIG. 8A is a sectional view of a multi-group lens assembly, formed by welding and fixing, before being fixed by welding according to a first variant of the first embodiment of the present invention.
Figure 8B:
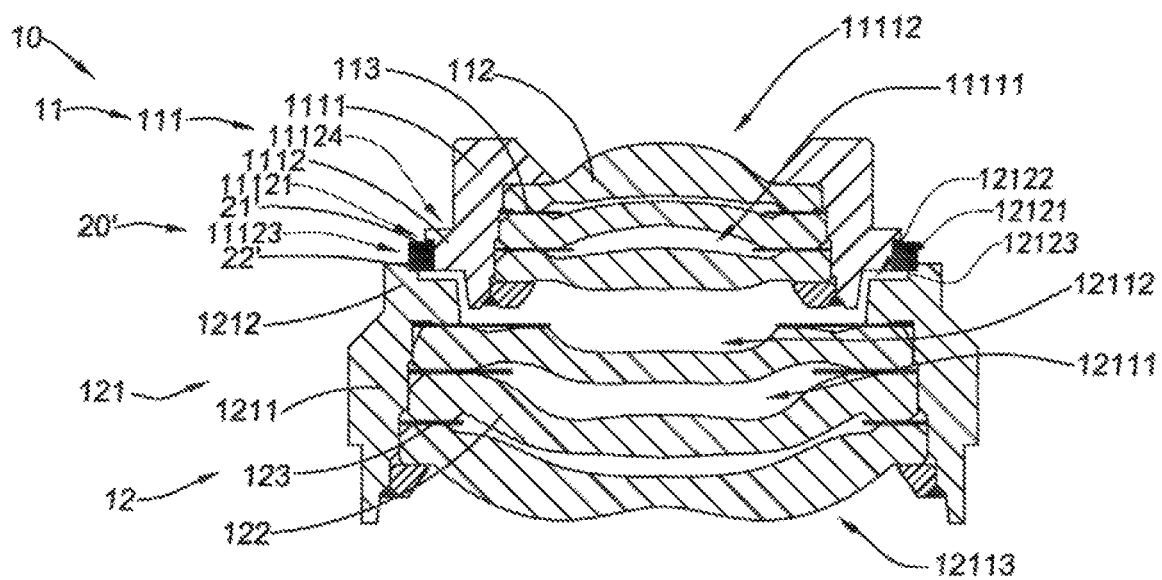
FIG. 8B is a sectional view of the multi-group lens assembly, formed by welding and fixing, after being welded according to the first variant of the first embodiment of the present invention.

It is worth mentioning that in the present invention, the number of the welding ports 11123 may be implemented as two or more, and the present invention is not limited in this aspect. Referring to FIG. 7, the optical module 300 according to this embodiment of the present invention is set forth in detail below. The optical module 300 includes a circuit board assembly 71, which is also referred to as a photosensitive assembly. The photosensitive assembly 71 includes a photosensitive element 711, a circuit board main body 712, a holder 713, a filtering element 714, and a plurality of electronic elements 715. The photosensitive element 711 is provided on the circuit board main body 712, the holder 713 is provided on the circuit board main body 712 and located outside the photosensitive element 711, and the filtering element 714 is provided in a photosensitive path of the photosensitive element 711 and is supported on the holder 713. The multi-group optical lens assembly 100 is provided in the photosensitive assembly 71 and located in the photosensitive path of the photosensitive element 711 of the photosensitive assembly 71.

It is worth mentioning that the optical module 300 further includes a lens assembly supporting element 72. When the lens assembly supporting element 72 integrally extends to the multi-group lens assembly 100, the optical module 300 is a fixed-focus module. When the lens assembly supporting element 72 is implemented as a motor, the optical module 300 is a zoom module.

It can be understood by those skilled in the art that since the multi-group lens assembly 100 of the present invention is fixed by welding through the welding structure 20 instead of being fixed by glue, the multi-group lens assembly 100 has a smaller size, and correspondingly, the optical module 300 also has a correspondingly smaller size. Furthermore, since the multi-group optical lens assembly 100 is not deformed irreversibly with a change in temperature, the optical module 300 has better stability.

Referring to FIG. 5 to FIG. 9, In a first variant of the first embodiment of the present invention, a first welding part 21' is provided on the first outer side face 11121 of the outer extension table 1112, at this time, the second welding part 22' is correspondingly provided on the second outer side face 12121 of the supporting table 1212, and when the first group unit 11 may be fixed relative to the second group unit 12, the first group unit 11 and the second group unit 12 may be fixed relatively by welding the first welding element 21' and the second welding element 22' horizontally.

Preferably, the welding port 11123 is provided on the supporting table 1212 of the second supporting component 121. After the second welding part 22' is provided on the second outer side face 12121 of the supporting table 1212, the second welding part 22' is exposed by the welding port 11123. Specifically, the supporting table 1212 further has a third outer side face 12123. In this embodiment, the welding port 11123 extends from the third outer side face 12123 to the second outer side face 12121, thereby partially exposing the welding port 11123, so that the welding head of the welding tool performs operations on the first welding part 21' through the welding port 11123.

Figure 9:
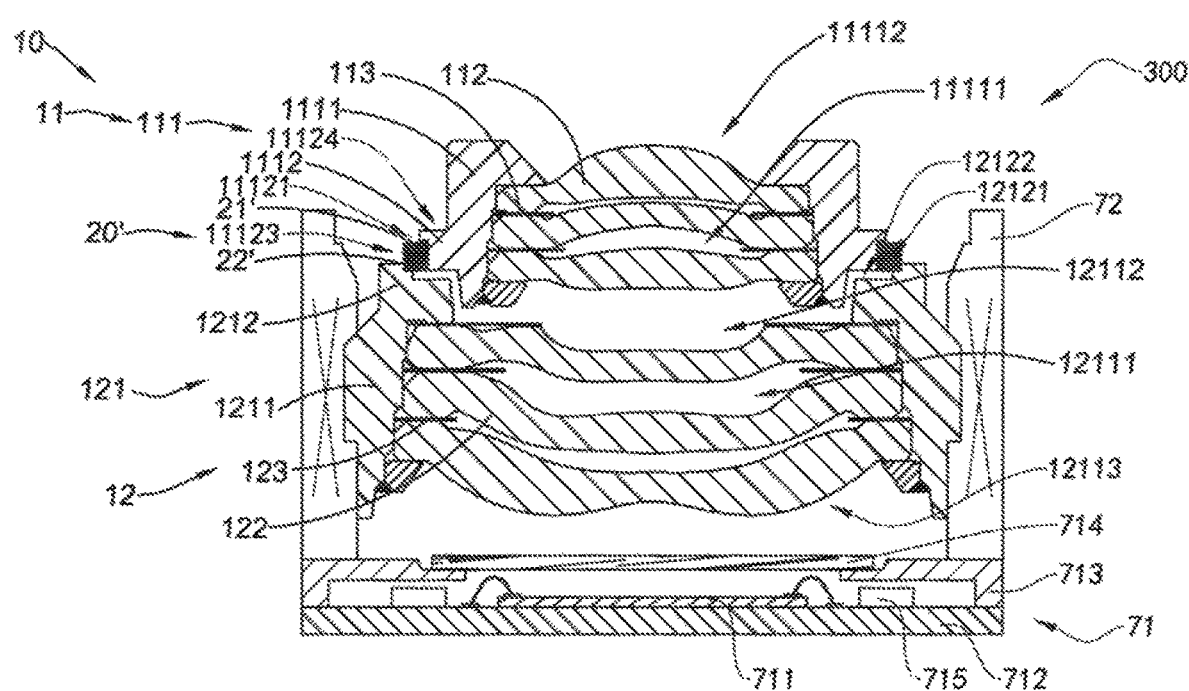
FIG. 9 is a schematic structural diagram of an optical module according to a first variant of the first embodiment of the present invention.
Figure 10A:
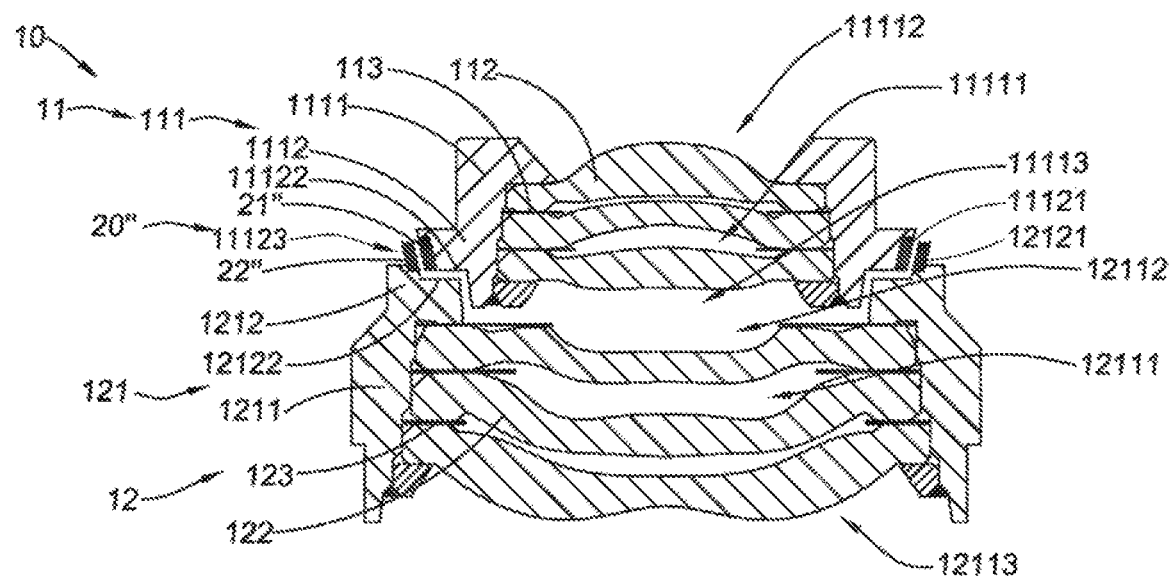
FIG. 10A is a sectional view of a multi-group lens assembly, formed by welding and fixing, before being fixed by welding according to a second variant of the first embodiment of the present invention.
Figure 10B:
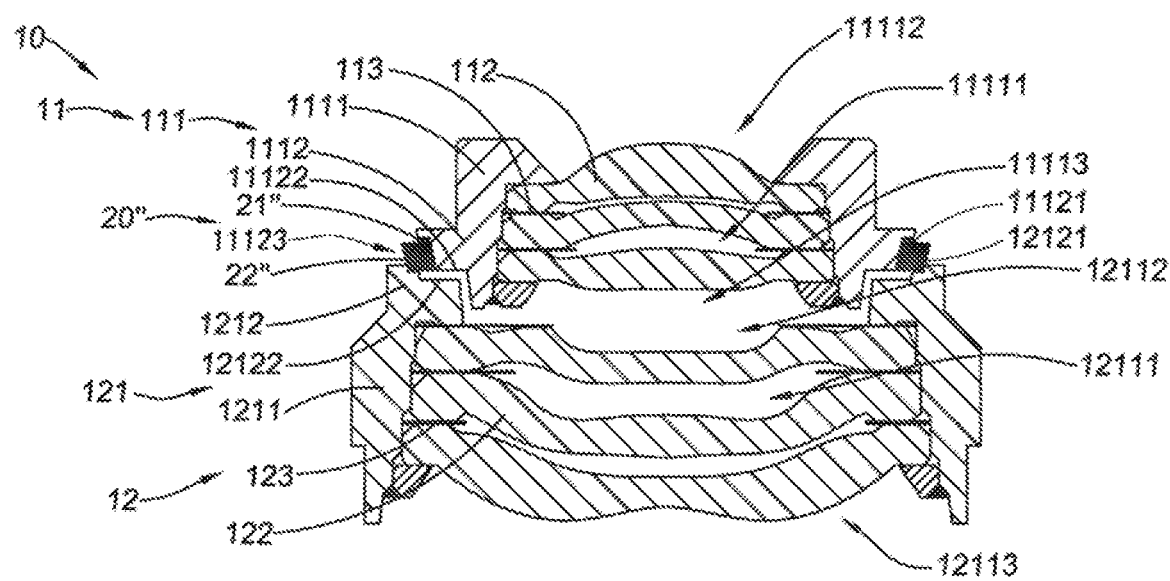
FIG. 10B is a sectional view of the multi-group lens assembly, formed by welding and fixing, after being welded according to the second variant of the first embodiment of the present invention.

Referring to FIG. 9, an optical module 300 according to this embodiment of the present invention is set forth in detail below. The optical module 300 includes a circuit board assembly 71, which is also referred to as a photosensitive assembly. The photosensitive assembly 71 includes a photosensitive element 711, a circuit board main body 712, a holder 713, a filtering element 714, and a plurality of electronic elements 715. The photosensitive element 711 is provided on the circuit board main body 712, the holder 713 is provided on the circuit board main body 712 and located outside the photosensitive element 711, and the filtering element 714 is provided in a photosensitive path of the photosensitive element 711 and is supported on the holder 713. The multi-group optical lens assembly 100 is provided in the photosensitive assembly 71 and located in the photosensitive path of the photosensitive element 711 of the photosensitive assembly 71.

It is worth mentioning that the optical module 300 further includes a lens assembly supporting element 72. When the lens assembly supporting element 72 integrally extends to the multi-group lens assembly 100, the optical module 300 is a fixed-focus module. When the lens assembly supporting element 72 is implemented as a motor, the optical module 300 is a zoom module.

It can be understood by those skilled in the art that since the multi-group lens assembly 100 is fixed by welding through a welding structure 20' instead of being fixed by glue, the multi-group lens assembly 100 has a smaller size, and correspondingly, the optical module 300 also has a correspondingly smaller size. Furthermore, since the multi-group optical lens assembly 100 is not deformed irreversibly with a change in temperature, the optical module 300 has better stability.

Referring to FIG. 5 to FIG. 9, FIG. 10A, and FIG. 10B, which relate to a second variant of the first embodiment, in the embodiment of the present invention, the first outer side face 11121 of the outer extension table 1112 and the second outer side face 12122 of the supporting table 1212 forms a preset angle with the vertical direction.

It can be understood by those skilled in the art that a first welding part 21" may be provided at other positions of the outer extension table 1112, and correspondingly, a second welding part 22" may also be provided at other positions of the supporting table 1212, so that after the first welding unit 21" is welded to the second welding part 22", the first group unit 11 and the second group unit 12 are fixed relatively.

Figure 11:
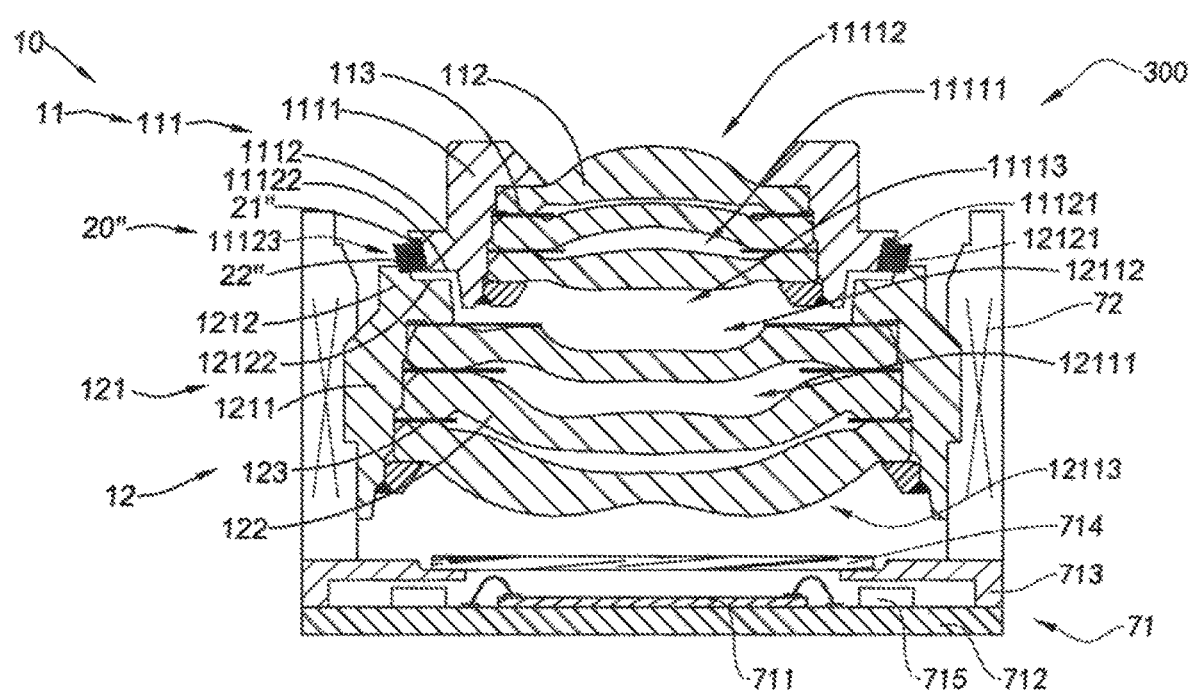
FIG. 11 is a schematic structural diagram of an optical module according to the second variant of the first embodiment of the present invention.

Referring to FIG. 11, the optical module 300 according to the embodiments of the present invention is set forth in detail below. The optical module 300 includes a circuit board assembly 71, which is also referred to as a photosensitive assembly. The photosensitive assembly 71 includes a photosensitive element 711, a circuit board main body 712, a holder 713, a filtering element 714, and a plurality of electronic elements 715. The photosensitive element 711 is provided on the circuit board main body 712, the holder 713 is provided on the circuit board main body 712 and located outside the photosensitive element 711, and the filtering element 714 is provided in a photosensitive path of the photosensitive element 711 and is supported on the holder 713. The multi-group optical lens assembly 100 is provided in the photosensitive assembly 71 and located in the photosensitive path of the photosensitive element 711 of the photosensitive assembly 71.

It is worth mentioning that the optical module 300 further includes a lens assembly supporting element 72. When the lens assembly supporting element 72 integrally extends to the multi-group lens assembly 100, the optical module 300 is a fixed-focus module. When the lens assembly supporting element 72 is implemented as a motor, the optical module 300 is a zoom module.

It can be understood by those skilled in the art that since the multi-group lens assembly 100 is fixed by welding through a welding structure 20" instead of being fixed by glue, the multi-group lens assembly 100 has a smaller size, and correspondingly, the optical module 300 also has a correspondingly smaller size. Furthermore, since the multi-group optical lens assembly 100 is not deformed irreversibly with a change in temperature, the optical module 300 has better stability.

Figure 12A:
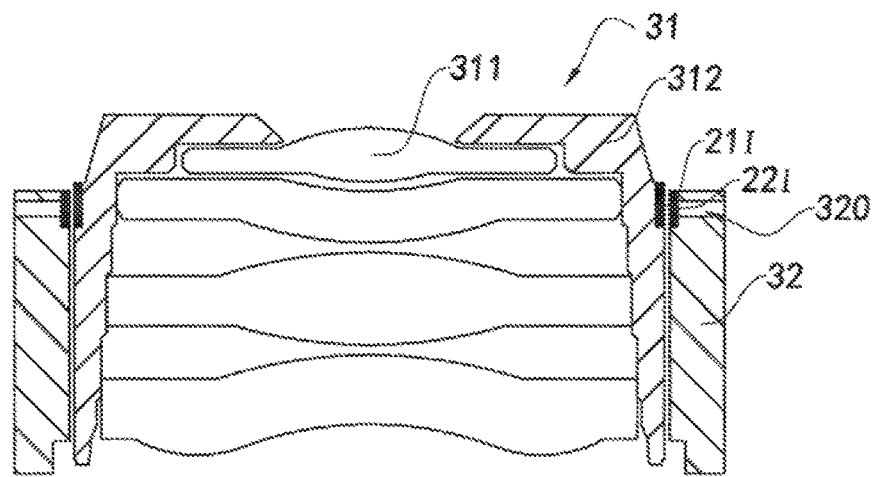
FIG. 12A is a schematic structural diagram of a first module assembly and a second module assembly before being welded, for an optical module according to the second embodiment of the present invention.
Figure 12B:
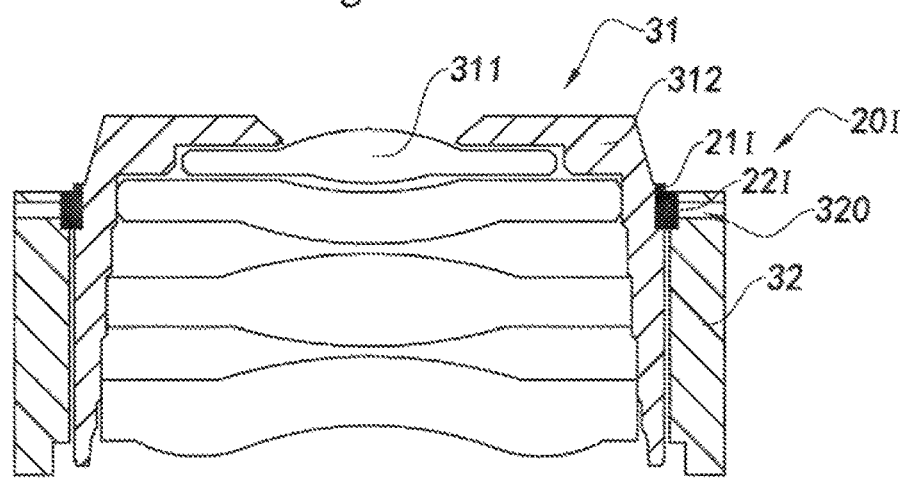
FIG. 12B is a schematic structural diagram of the first module assembly and the second module assembly after being welded, for the optical module according to the second embodiment of the present invention.
Figure 12C:
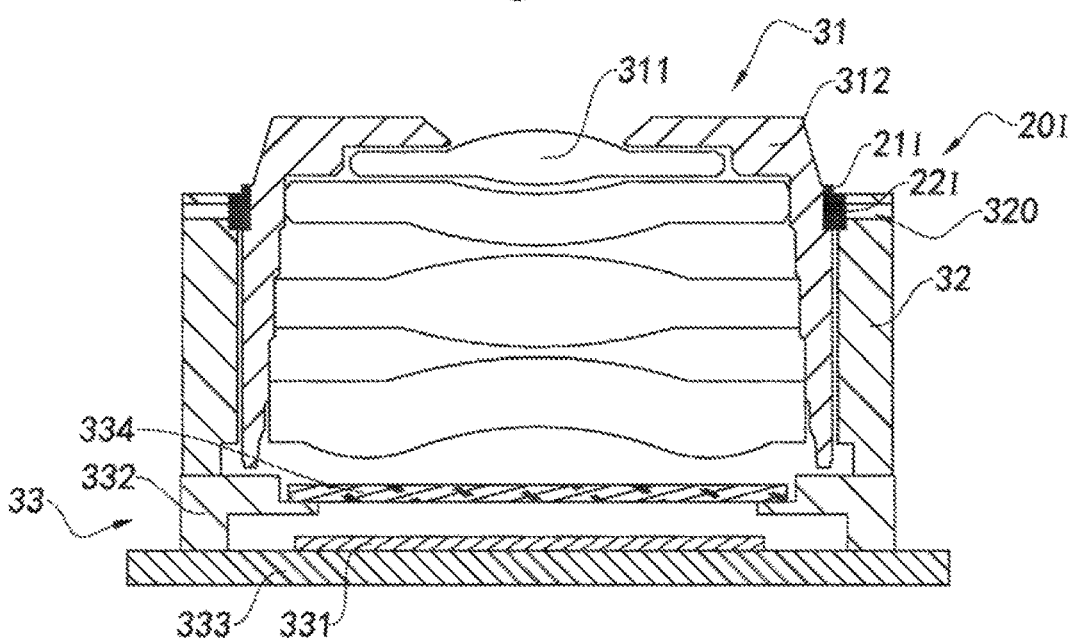
FIG. 12C is a schematic structural diagram of the optical module according to the second embodiment of the present invention.

Referring to FIG. 12A, FIG. 12B, and FIG. 12C, in a second embodiment of the present invention, the first module assembly and the second module assembly are implemented as a lens assembly 31 and a lens assembly supporting element 32 respectively. In the embodiment of the present invention, the lens assembly 31 may be implemented as the multi-group lens assembly in the above embodiment of the present invention and may also be implemented as an integrated lens assembly, and the present invention is not limited in this aspect. In order to enable those skilled in the art to clearly understand the present invention, the lens assembly 31 described in the following examples is exemplified by an integral lens assembly.

In the embodiment of the present invention, the lens assembly 31 includes at least a set of lenses 311 and a mounting body 312, wherein the lens 311 is mounted to the mounting body 312. A first welding part 21I of a welding structure 20I is provided on an outer wall of the mounting body 312 and a second welding part 22I is provided on an inner wall of the lens assembly supporting element 32, so that when the lens assembly 31 is mounted to the lens assembly supporting element 32, the lens assembly 31 and the lens assembly supporting element 32 may be fixed relatively by welding the first welding part 31 and the second welding part 32.

Specifically, in this embodiment, the lens assembly supporting element 32 has a welding port 320, wherein the welding port 320 extends from the inner wall of the lens supporting component 32 to the outer wall of the lens assembly supporting element 32, so that the welding head of the welding tool perform a welding operation on the first welding part 21I through the welding port 320.

It is worth mentioning that in the embodiment of the present invention, since the first welding part 21I and the second welding part 22I are provided on the mounting body 312 of the lens assembly 31 and the lens assembly supporting element 32 respectively, and the lens assembly 31 and the lens assembly supporting element 32 are fixed relatively by welding the first welding part 21I and the second welding part 22I through laser welding, the gap between the mounting body 312 of the lens assembly 31 and the lens assembly supporting element 32 is smaller than that of the prior art in which they are fixed by other media such as glue, so that when the lens assembly 31 and the lens assembly supporting element 32 are mounted to the optical module 300 as a whole, the optical module 300 has a smaller size correspondingly.

It is further worth mentioning that in the embodiment of the present invention, since the first welding part 21I and the second welding part 22I are preferably made of a metal material, when the lens assembly 31 and the lens assembly supporting element 32 are provided in the optical module 300 and the optical module 300 is often in an environment with an increased temperature difference, the relative position between the lens assembly 31 and the lens assembly supporting element 32 would not have a large relative displacement due to uneven thermal expansion, so that the lens assembly can maintain stable optical performance.

Further, the optical module 300 according to this embodiment of the present invention is set forth in detail below. The optical module 300 includes the first module assembly and the second module assembly. Furthermore, the optical module 300 further includes a photosensitive assembly 33. The photosensitive assembly 33 includes a photosensitive element 331, a circuit board main body 332, a holder 333, a filtering element 334, and a plurality of electronic elements 335. The photosensitive element 331 is provided on the circuit board main body 332, the holder 333 is provided on the circuit board main body 332 and located outside the photosensitive element 331, and the filtering element 334 is provided in a photosensitive path of the photosensitive element 331 and is supported on the holder 333. The lens assembly 31 is provided in the photosensitive assembly 33 and located in the photosensitive path of the photosensitive element 331 of the photosensitive assembly 33.

It is worth mentioning that the optical module 300 further comprises a lens assembly supporting element 32. When the lens assembly supporting element 32 integrally extends to the lens assembly 31, the optical module 300 is a fixed-focus module. When the lens assembly supporting element 32 is implemented as a motor, the optical module 300 is a zoom module.

It can be understood by those skilled in the art that since the lens assembly 31 and the lens assembly supporting element 32 is fixed by welding through a welding structure 20' instead of being fixed by glue, the lens assembly 31 and the lens assembly supporting element 32 can have a smaller size, and correspondingly, the optical module 300 also has a correspondingly smaller size. Furthermore, since the lens assembly 31 is not deformed irreversibly with a change in temperature, the optical module 300 has better stability.

Figure 13A:
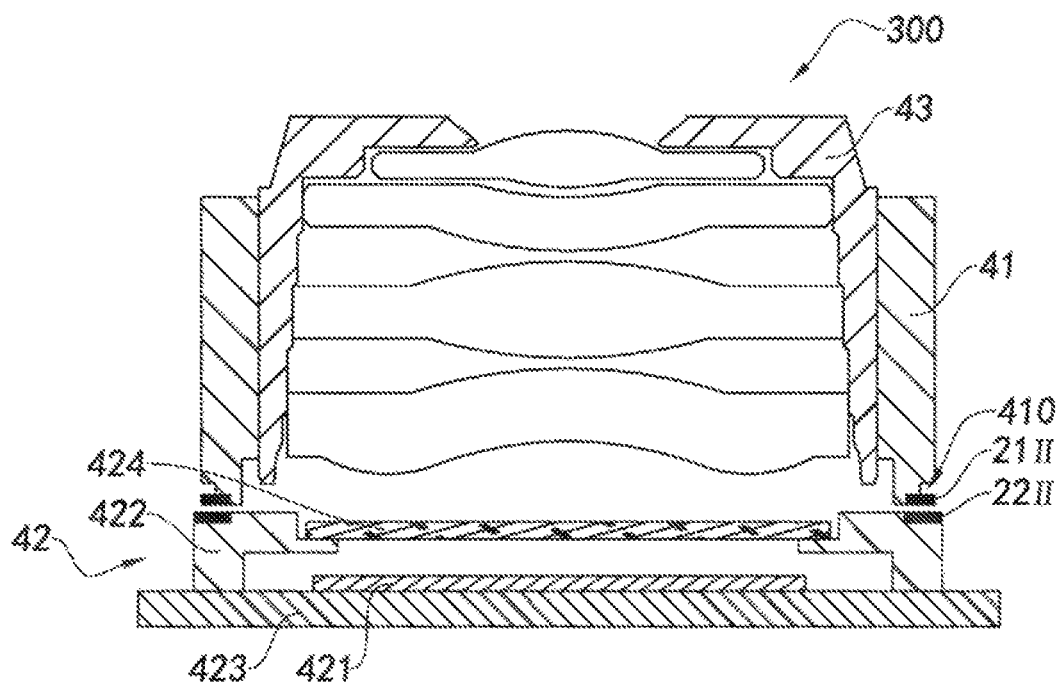
FIG. 13A is a schematic diagram of a first module assembly and a second module assembly before being welded according to a third embodiment of the present invention.
Figure 13B:
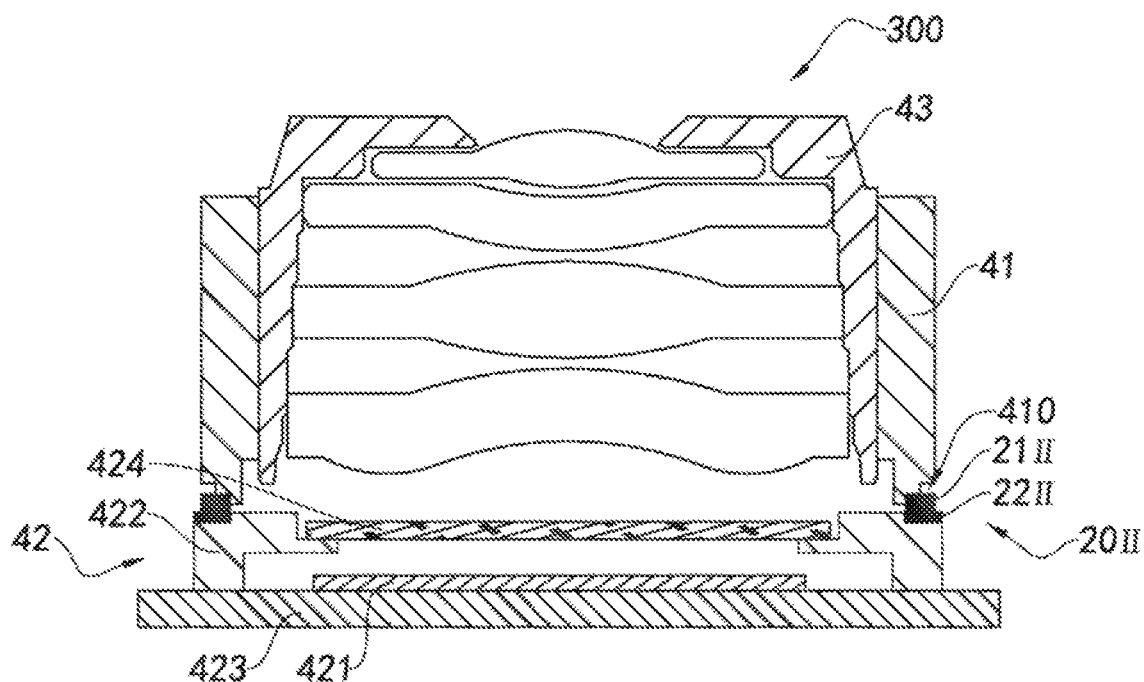
FIG. 13B is a schematic diagram of the first module assembly and the second module assembly according to the third embodiment of the present invention.

Referring to FIG. 13A and FIG. 13B, which relate to a third embodiment of the present invention, in this embodiment, the first module assembly is implemented as a lens assembly supporting member 41, wherein at least a lens assembly 43 is mounted to the lens assembly supporting member 41, the second module assembly is implemented as a circuit board assembly 42, wherein the circuit board assembly 42 includes at least a photosensitive element 421, at least a holder 422, and at least a circuit board main body 423, and preferably, the circuit board assembly 42 further includes a filtering element 424, wherein the photosensitive element 421 is provided on the circuit board main body 423 and electrically connected to the circuit board main body 423, the holder 422 is mounted to the circuit board main body 423 to support the lens assembly supporting member 41, and the filtering element 424 is mounted on the holder 422 and located in a photosensitive path of the photosensitive element 421.

In the embodiment of the present invention, a first welding part 21II and a second welding part 22II of a welding structure 20II are provided at the bottom of the lens assembly supporting member 41 and the top of the holder 422 respectively, so that the lens assembly supporting member 41 to which the lens assembly 43 is mounted and the holder 422 of the circuit board assembly 42 may be fixed relatively by welding the first welding part 21II and the second welding part 22II through laser welding. It can understood by those skilled in the art from the above description that a fixed-focus optical module may be formed in the above fixing manner.

Preferably, in this embodiment, the lens assembly supporting member 41 has a welding port 410, wherein the welding port 410 is provided at the bottom of the lens assembly supporting member 41, so that when the first welding part 21II is provided at the bottom of the lens assembly supporting member 41, the first welding part 21II is partially exposed by the welding port 410, and thus, the welding head of the welding tool perform operations on the first welding part 21II through the welding port 4120.

It can be understood by those skilled in the art that in a variant of the embodiment, the welding port 410 may be provided on the top of the holder 422 of the circuit board assembly 42, so that when the second welding part 21 is provided on the top of the holder 422, the second welding piece 22II is partially exposed by the welding port 410, and thus, the welding head of the welding tool perform operations on the first welding part 22 through the welding port 410. It is worth mentioning that, in the embodiment of the present invention, since the first welding part 21II and the second welding part 22II are both made of a metal material, when the lens assembly supporting member 41 and the circuit board assembly 42 are provided in the optical module 300 and the optical module 300 is often in an environment with an increased temperature difference, the relative position between the lens assembly supporting member 41 and the circuit board assembly 42 would not have a large relative displacement due to uneven thermal expansion, so that the lens assembly can maintain stable optical performance.

Figure 14A:
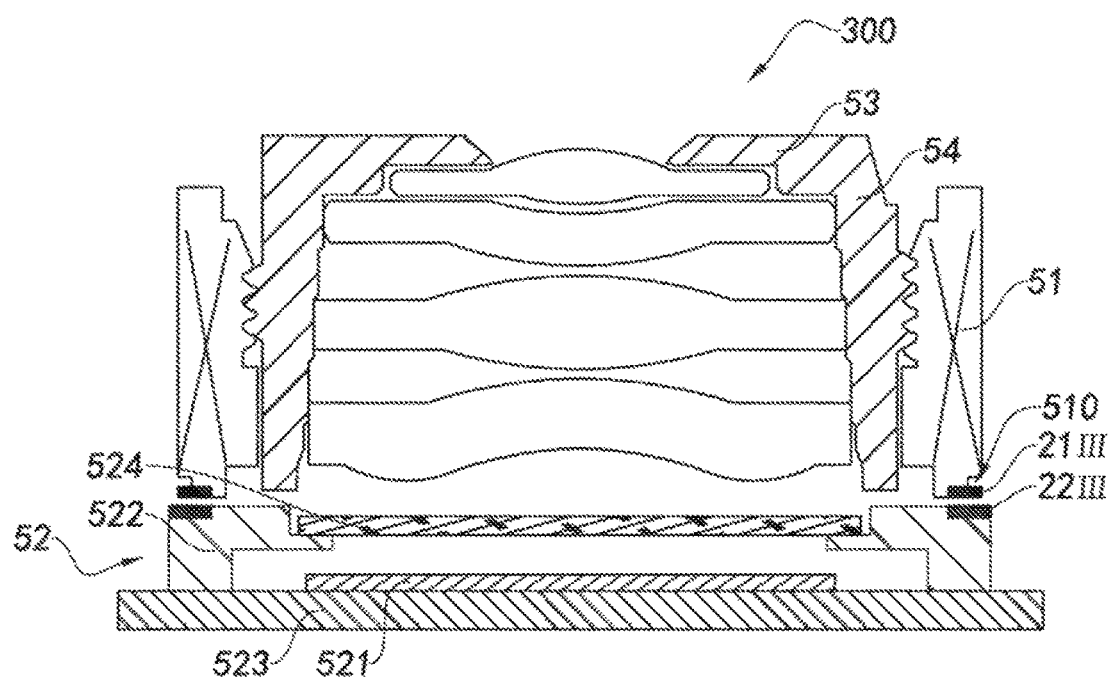
FIG. 14A is a schematic structural diagram of a first module assembly and a second module assembly according to a variant of the third embodiment of the present invention.
Figure 14B:
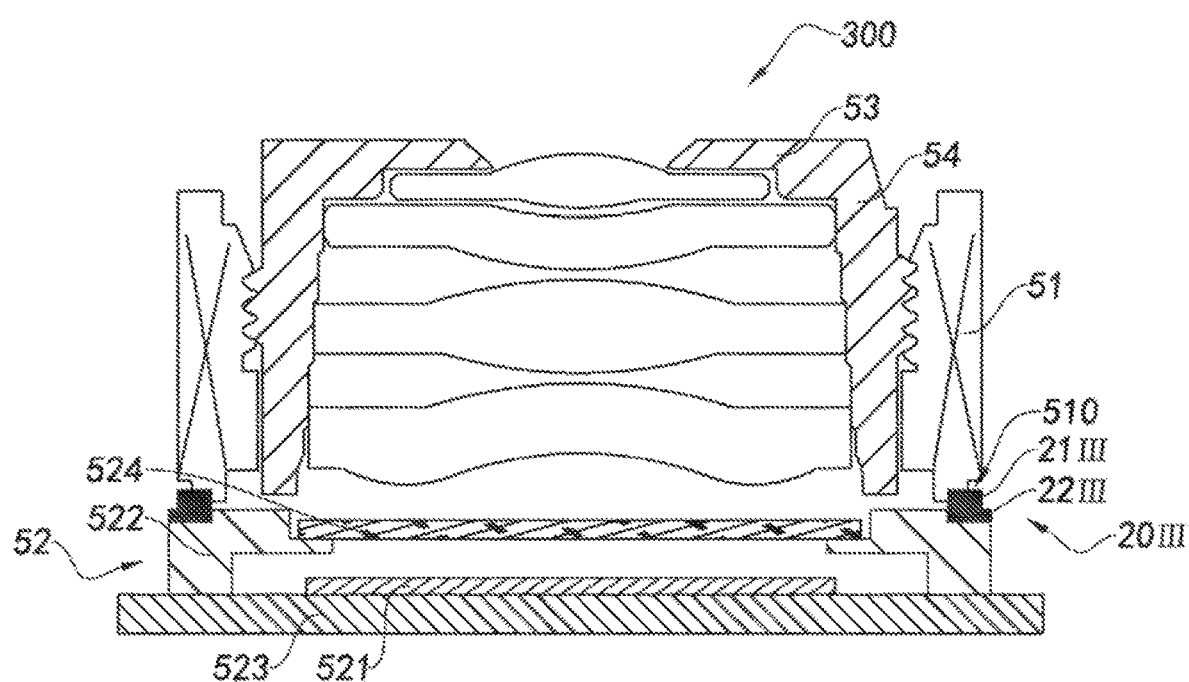
FIG. 14B is a schematic structural diagram of the first module assembly and the second module assembly according to a variant of the third embodiment of the present invention.

Referring to FIG. 14A and FIG. 14B, in a variant of the third embodiment of the present invention, the first module assembly is implemented as a driving element such as a motor 51, wherein at least a lens assembly is mounted on the motor 51. Specifically, the lens assembly includes at least a set of lenses 53 and a lens barrel 54, wherein the lens 53 is mounted in the lens barrel 54, and wherein the lens assembly may be the multi-group lens assembly in the above embodiment and may also be the conventional integrated lens assembly, and the present invention is not limited in this aspect. In order to enable those skilled in the art to understand the present invention, the following embodiment is exemplified by an integrated lens assembly in which a first welding part 21III is provided on a bottom wall of the motor. In this embodiment, the second module assembly is implemented as a circuit board assembly 52, and the circuit board assembly 52 is also referred to as a photosensitive assembly, wherein the photosensitive assembly 52 includes at least a photosensitive element 521, at least a holder 522, and at least a circuit board main body 523, and preferably, the photosensitive assembly 52 further includes a filtering element 524, wherein the photosensitive element 521 is provided on the circuit board main body 523 and electrically connected to the circuit board main body 523, the holder 522 is mounted to the circuit board main body 523 to support the motor 51, and the filtering element 524 is mounted on the holder 522 and located in a photosensitive path of the photosensitive element 521.

In the embodiment of the present invention, a second welding part 22III of a welding structure 20III is provided on the top of the holder 522 of the photosensitive assembly 52, when the motor 51 is mounted on the photosensitive assembly 52, the first welding part 51 and the second welding part 22III are located between the motor 51 and the photosensitive assembly 52, and when the motor 51 needs to be fixed on the photosensitive assembly 52, the motor 51 and the photosensitive assembly 52 may be fixed relatively just by welding the first welding part 21III and the second welding part 22III through laser welding.

Preferably, in this embodiment, the motor 51 has a welding port 510, wherein the welding port 510 is provided at the bottom of the motor 51 so that when the first welding part 21III is provided at the bottom of the motor 51, the first welding part 21III is partially exposed by the welding port 510, and thus, the welding head of the welding tool perform operations on the first welding part 21III through the welding port 510. In a variant of the embodiment, the welding port 510 is provided on top of the holder 522, and the present invention is not limited in this aspect.

In the embodiment of the present invention, since the motor 51 and the photosensitive assembly 52 are welded by the first welding part 21III and the second welding part 22III, when the optical module is in an environment with large temperature difference, the relative position between the motor 51 and the photosensitive assembly 52 would not change easily, so that the lens assembly can maintain stable optical performance.

It is worth mentioning that in the above embodiment, when the motor 51 and the photosensitive assembly 52 are fixed relatively, the lens assembly can be held in a photosensitive path of a photosensitive chip of the photosensitive assembly 52.

It is further worth mentioning that in the embodiment of the present invention, since the motor 51 and the holder of the photosensitive assembly 52 are connected by the first welding part 21III and the second welding part 22III, and the first welding part 21III and the second welding part 22III are provided on the motor 51 and the photosensitive assembly 52 respectively, when the motor 51 and the photosensitive assembly 52 are fixed relatively, a smaller or even no gap may be formed, thereby reducing the overall size of the optical module.

Figure 15:
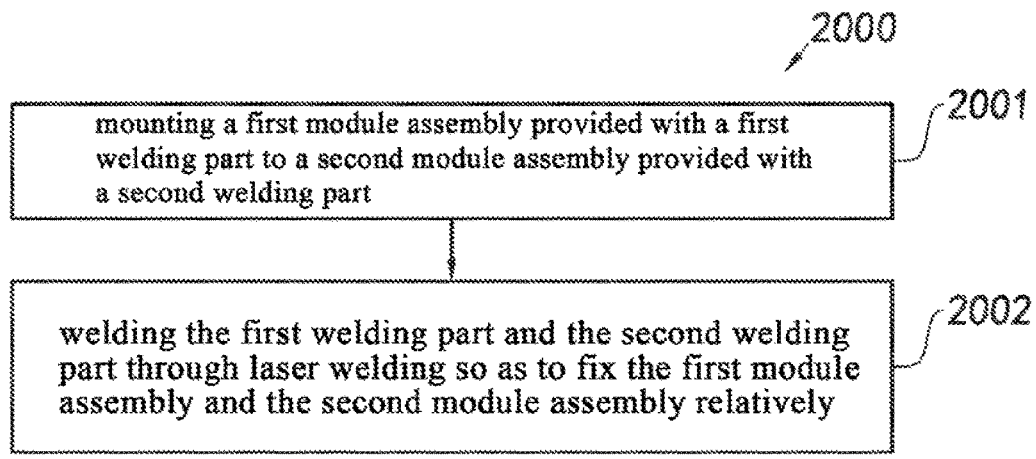
FIG. 15 is a flow chart showing a welding and fixing method used in a manufacturing process for an optical module according to the present invention.

Referring to FIG. 15, according to another aspect of the present invention, the present invention provides an optical module manufacturing process 2000, wherein the process includes:

step 2001, (1) mounting a first module assembly provided with a first welding part to a second module assembly provided with a second welding part; and step 2002, (2) welding the first welding part and the second welding part through laser welding so as to fix the first module assembly and the second module assembly relatively.

In an embodiment of the present invention, the step (1) and the step (2) are respectively implemented as:

(S1) mounting the first group unit 11 provided with the first welding part 21 to the second group unit 12 provided with the second welding part 22, wherein the first welding part is provided on the first supporting component 111 of the first group unit 11, the second welding part is provided on the second supporting component 121 of the second group unit 12, and the first group unit and the second group unit form the group unit 10, wherein at least one group unit 10 forms a multi-group lens assembly; and (S2) fixing the first group unit 11 and the second group unit 12 relatively by welding the first welding part 21 and the second welding part 22.

It is worth mentioning that between the step (S1) and the step (S2), the method further includes:

(S0) aligning the first group unit 11 and the second group unit 12 through AA (Active Alignment) in different directions in a stereoscopic space.

The alignment in the step (S0) may be one selected from alignment in the horizontal direction, alignment in the vertical direction, and alignment in a manner of rotating by taking the optical axis of the first group unit 11 or the second group unit 12 as a rotation axis.

Figure 16:
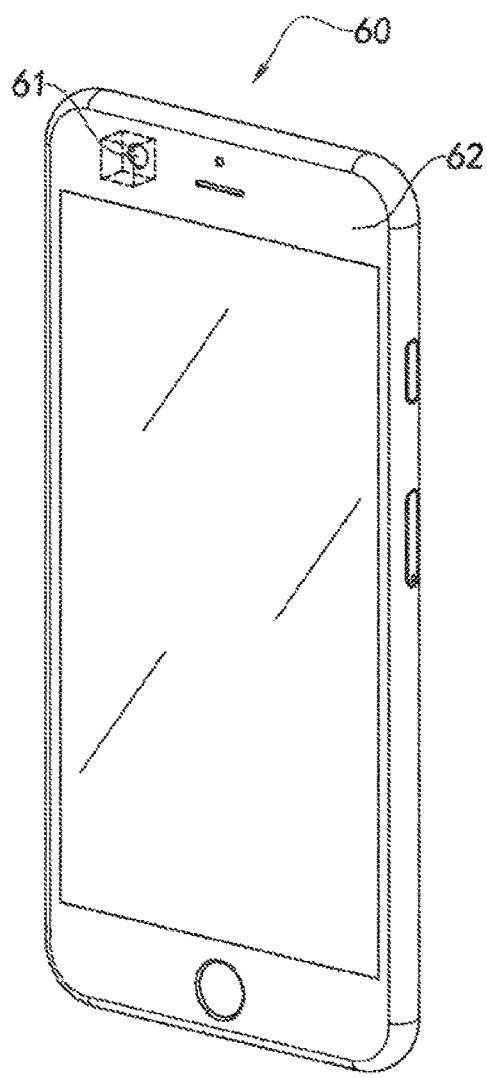
FIG. 16 is a schematic diagram of an electronic device having an optical module formed by welding and fixing according to the present invention.

Referring to FIG. 16, according to another aspect of the present invention, the present invention provides an electronic device 60, wherein the electronic device 60 comprises an optical module 61 which further comprises a first module assembly, a second module assembly, and a welding structure that are formed by welding and fixing, wherein the welding structure includes a first welding part which is provided on the first module assembly and a second welding part which is provided on the second module assembly, and the first module assembly and the second module assembly may be fixed relatively by welding the first welding part and the second welding part through laser welding.

The electronic device 60 in the present invention may be implemented as, but not limited to, a mobile phone, a tablet computer, or the like.

Specifically, the electronic device 60 includes a device body 62, wherein the optical module 61 is provided in the device body 62.

It is worth mentioning that in all the above embodiments of the present invention, the first module assembly and the second module assembly may be provided with a plurality of the first welding parts and the plurality of the second welding parts respectively, and the present invention is not limited in this aspect.

It is further worth mentioning that the implementations in the above embodiments can be applied to a same optical module at the same time, and the present invention is not limited in this aspect.

It is also worth mentioning that in the above embodiments of the present invention, the first welding part 21 and the second welding part 22 may be implemented as a metal material, a non-metal material, a composite material or the like.

It is worth mentioning that reference is made to FIGS. 2A, 2B and 2C, FIGS. 3A, 3B and 3C and FIGS. 4A, 4B and 4C. In the above embodiments of the present invention, after the first welding part 21 and the second welding part 22 are provided in the first module assembly and the second module assembly respectively, and when they are not welded to each other, the first welding part 21 and the second welding part 22 have a first exposed surface 210 and a second exposed surface 220, respectively, wherein when the first welding part 21 is welded to the second welding part 22, the first exposed surface 210 of the first welding part 21 and the second exposed surface 220 of the second welding part 22 are fixed by each other.

It is further worth mentioning that the first welding part 21 and the second welding part 22 are respectively fixed to the first module assembly and the second module by means of embed-molding or attaching. Preferably, in the embodiments of the present invention, the first welding part 21 and the second welding part 22 are respectively fixed to the first module assembly and the second module assembly by means of embed-molding.

Specifically, the first welding part 21 has at least a first embedding portion 211 and at least a first connecting portion 212, wherein the first connecting portion 212 extends integrally from the first embedding portion 211, and when the first welding part 21 is provided on the first module assembly, the first embedding portion 211 is embedded into the first module assembly, and the first exposed surface 210 is located at the first connecting portion 212; the second welding part 22 has at least a second embedding portion 221 and at least a second connecting portion 222, wherein the second connecting portion 222 extends integrally from the second embedding portion 221, and when the second welding part 22 is provided on the second module assembly, the second embedding portion 221 is embedded into the second module assembly, and the second exposed surface 220 is located in the second connecting portion 222; after the first welding part 21 is welded to the second welding part 22, the first exposed surface 210 of the first connecting portion 212 and the second exposed surface 220 of the second connecting portion 222 are opposite to each other such that the first welding part 21 and the second welding part 22 are welded to each other so as to further fix the first module assembly and the second module assembly relatively.

It is worth mentioning that before the first welding part 21 and the second welding part 22 are welded and fixed, the first exposed surface 210 formed by the first connecting portion 212 of the first welding part 21 can be opposite to the second exposed surface 220 formed by the second connecting portion 222 of the second welding part 22, and then when the first welding part 21 is welded to the second welding part 22, the first connecting portion 212 and the second connecting portion 222 are bonded to each other through the first exposed surface 210 and the second exposed surface 220, thereby enabling the first module assembly and the second module assembly to be fixed to each other by means of a connection between the first connecting portion 212 and the second connecting portion 222.

Figure 2A:
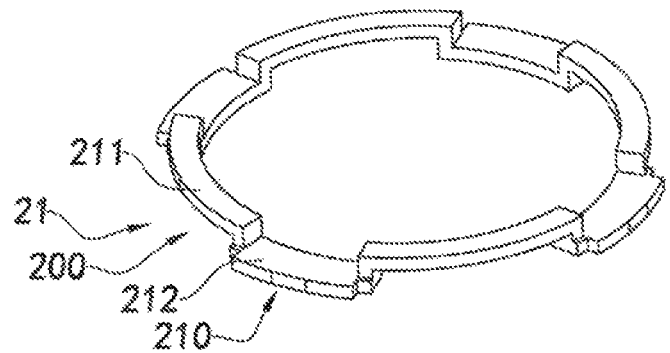
FIG. 2A is a schematic diagram of a first welding part of a welding structure for an optical module according to a first embodiment of the present invention.
Figure 2B:
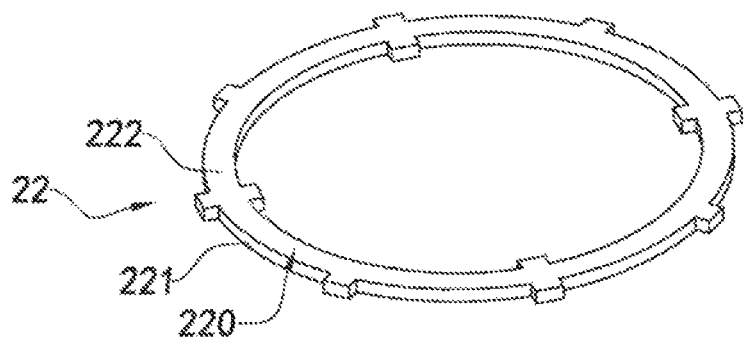
FIG. 2B is a schematic diagram of a second welding part of the welding structure for the optical module according to the first embodiment of the present invention.
Figure 2C:
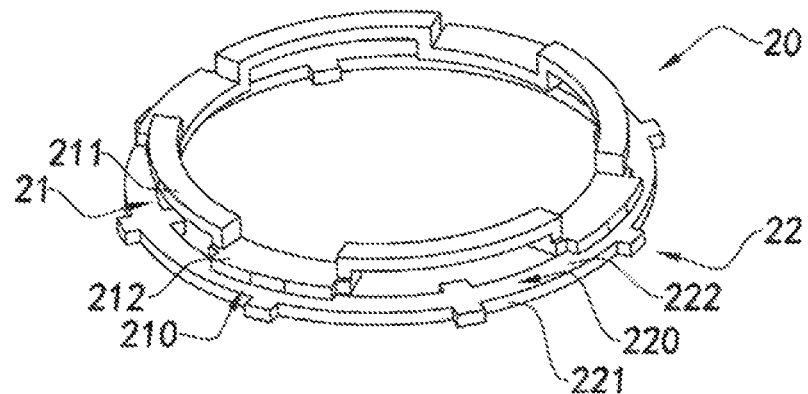
FIG. 2C is a schematic diagram of the welding structure for the optical module before being welded according to the first embodiment of the present invention.

It is further worth mentioning that in the present invention, the first welding part 21 and the second welding part 22 may have a same shape structure, and may have different shape structures. For example, FIGS. 2A and 2B show schematic structural diagrams of two different shapes of the first welding part 21 described in the present invention, respectively, and FIG. 2C shows a schematic diagram in which the first welding part 21 is supported on the second welding part 22 when the first welding part 21 is implemented as the structure illustrated in FIG. 2A and the second welding part 22 is implemented as the structure illustrated in FIG. 2B. It can be understood by those skilled in the art that when the first welding part 21 and the second welding part 22 are respectively provided on the first module assembly and the second module assembly described in the above embodiments, the first module assembly can be relatively fixed to the second module assembly by welding the first welding part 21 and the second welding part 22.

In the present invention, the first welding part 21 and the second welding part 22 may have various shapes. For example, in an embodiment of the present invention, the first embedding portion 211 and the first connecting portion 212 are two side portions of the first welding part 21, and specifically may be the upper and lower portions of the first welding part 21, and may also be the left and right portions of the first welding part 21. The second embedding portion 212 and the second connecting portion 212 may be provided to have the same shape as or different shapes than the first embedding portion 211 of the first welding part 21, that is, the welding structure may be a bond between the first welding part 21 and the second welding part 22 of the same shape, or may be a bond between the first welding part 21 and the second welding part 22 of different shapes, and the present invention is not limited in this aspect.

For example, referring to FIG. 2A, in the first embodiment of the present invention, the first welding part 21 and the second welding part 22 are adapted to be mounted to the first module assembly and the second module assembly having a horizontal plane, for example, the first module assembly as shown in FIGS. 5, 13A, 13B, 14B and 15B. In this embodiment, the first welding part 21 has an annular structure, and the first embedding portion 211 and the first connecting portion 212 of the first welding part 21 have different heights, so as to form an embedded space 200 between the first embedding portion 211 and two adjacent first connecting portions 212 for embedding the first module assembly.

For example, referring to FIG. 2B again, in the first embodiment of the present invention, the second welding part 22 is adapted to be mounted to the first module assembly and the second module assembly having a horizontal plane. In the first embodiment of the present invention, the first embedding portion 211 and the second connecting portion 212 of the second welding part 22 have the same height. In this embodiment, the second welding part 22 is also implemented as an annular shape, the second connecting portion 222 of the second welding part 22 is an enclosed annular ring, and the second embedding portion 221 of the second welding part 22 is a protrusion extending radially from the second connecting portion 222. After the second welding part 22 is provided on the first module assembly, the second connecting portion 222 of the second welding part 22 forms the second exposed surface 220.

In addition, in the present invention, the first welding part 21 and the second welding part 22 may be implemented to have the same shape structure, or may be implemented to have different shape structures, and the present invention is not limited in this aspect.

Figure 3A:
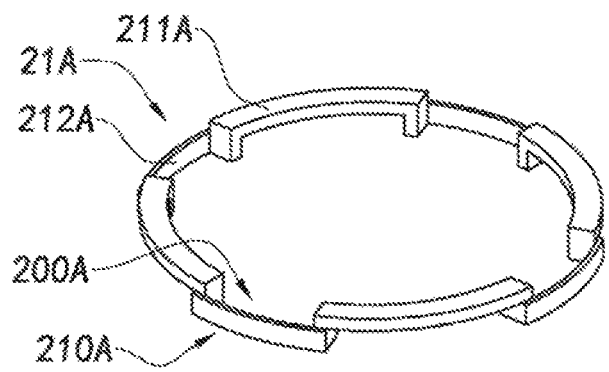
FIG. 3A is a schematic diagram of a first welding part of a welding structure for an optical module according to a second embodiment of the present invention.
Figure 3B:
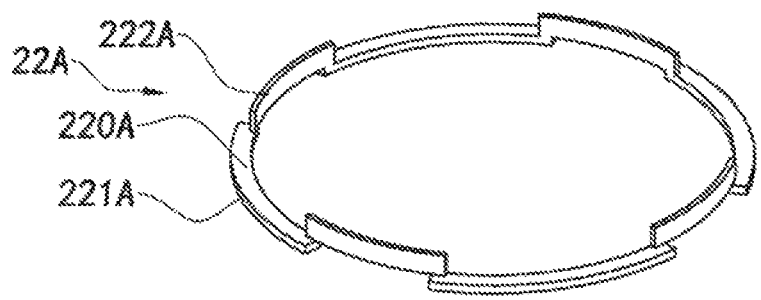
FIG. 3B is a schematic diagram of a variant of the first welding part of an embodiment of a welding structure for an optical module according to a variant of the second embodiment of the present invention.
Figure 3C:
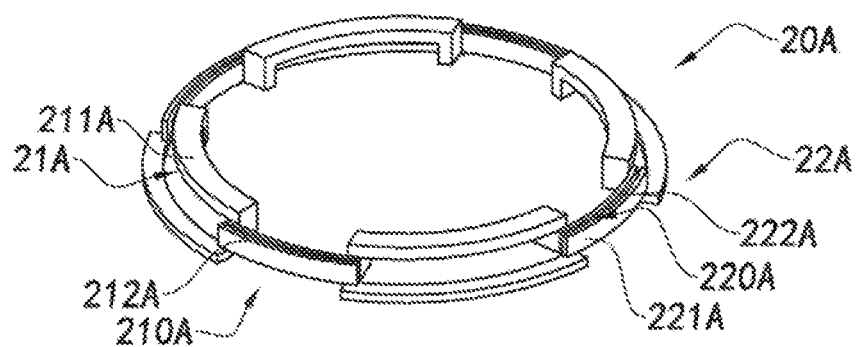
FIG. 3C is a schematic diagram of the welding structure before being welded according to the second embodiment of the present invention.

For example, as shown in FIGS. 3A, 3B, and 3C, in the second embodiment of the present invention, the first welding part 21A and the second welding part 22A have different structures. In this embodiment, the first welding part 21A and the second welding part 22A are adapted to be provided on the first module assembly and the second module assembly having a vertical plane, as shown in the FIGS. 8A, 8B, 10A and 10B. In this embodiment, the first welding part 21A and the second welding part 22A are respectively implemented as an annular structure. The first connecting portion 212A is formed by a part of the first welding part 21A that is outer part in the horizontal direction, and the first embedding portion 211A is formed by a part of the first welding part 21A that is inner part in the horizontal direction.

After the first welding part 21A is provided on the first module assembly, the first connecting portion 212 forms the first exposed surface 210A.

In addition, in an embodiment of the present invention, the shape of the first welding part 21 and/or the second welding part 22 may be implemented as an integrally formed annular shape, or may be implemented to be composed of at least two parts that are separated, and the present invention is not limited in this aspect.

Figure 4A:
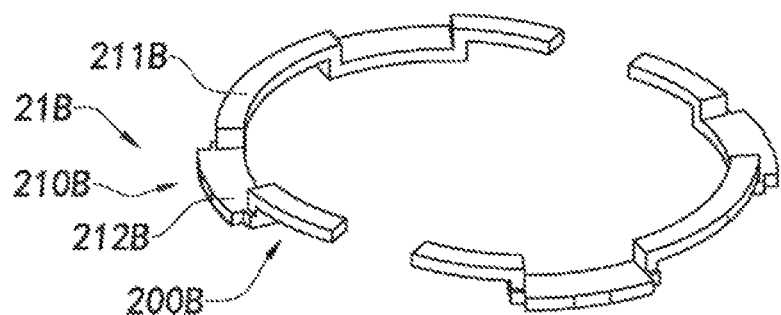
FIG. 4A is a schematic diagram of a first welding part of a welding structure for an optical module according to a third embodiment of the present invention.
Figure 4B:
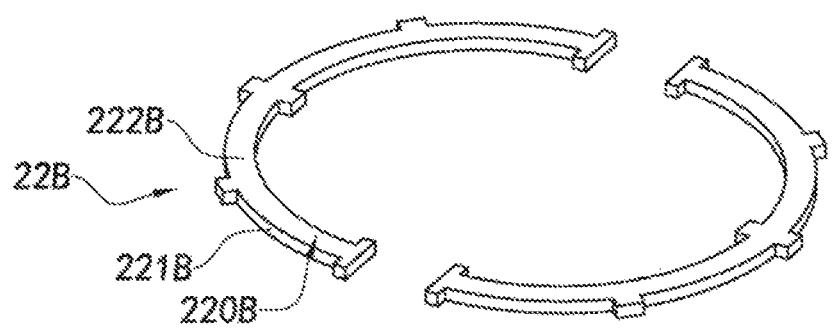
FIG. 4B is a schematic diagram of a variant of a first welding part of an embodiment of a welding structure for an optical module according to a variant of the third embodiment of the present invention.
Figure 4C:
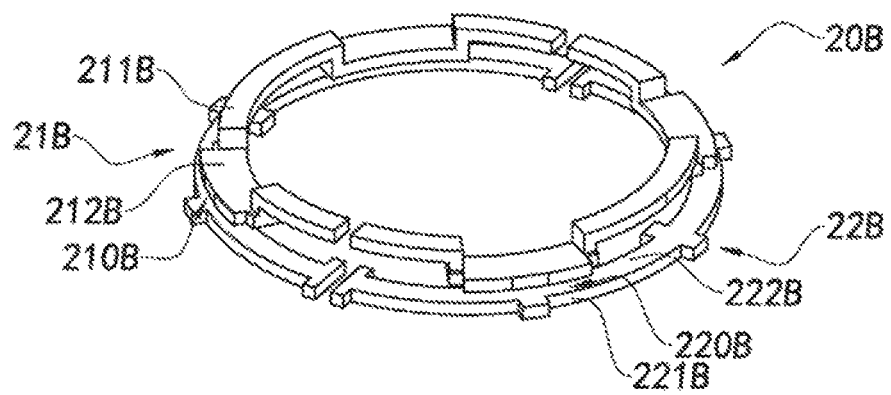
FIG. 4C is a schematic diagram of a welding structure for an optical module before being welded according to the present invention.

This is shown in FIGS. 4A, 4B and 4C. In this embodiment, the first welding part 21B and the second welding part 22B are respectively implemented to be composed of two parts that are separated. Each part of the first welding part 21B includes a first embedding portion 211B and a first connecting portion 212B. Each part of the second welding part 22B includes a second embedding portion 221B and a second connecting portion 222B. The first welding part 21B and the second welding part 22B are respectively mounted on the first module assembly and the second module assembly to form a first exposed surface 210B and a second exposed surface 220B, respectively, wherein the first welding part 21B and the second welding part 22B are connected to each other after the first welding part 21B is welded to the second welding part 22B.

It can be understood by those skilled in the art that in other embodiments of the present invention, the first welding part 21B and the second welding part 22B may also be implemented to include three or more parts that are separated, and the present invention is not limited in this aspect.

It can thus be seen that the object of the present invention can be fully and efficiently accomplished. The embodiment has been illustrated and described in detail to explain the function and the structure principle of the present invention, and the present invention is not limited to changes based on the principle of these embodiments. Accordingly, the present invention comprises all modifications that fall within the scope and spirit of the appended claims.

The invention claimed is:

1. A multi-group lens assembly, comprising:
at least a first group unit that includes a first supporting component and a first group lens, the first group lens being mounted on the first supporting component;
at least a second group unit that includes a second supporting component and a second group lens, the second group lens being mounted on the second supporting component, and when the first group unit is mounted on the second group unit, the first supporting component is supported by the second supporting component; and
a welding structure that includes at least a first welding part and at least a second welding part that is welded and fixed to the first welding part, the first welding part and the second welding part being provided on the first supporting component and the second supporting component, respectively,
wherein at least one selected from the first welding part or the second welding part is implemented as an enclosed annular shape,
wherein the first group unit and the second group unit are permanently and stably connected and fixed to each other by the first welding part and the second welding part being welded and fixed to each other, and
wherein the first welding part includes a first embedding portion and a first connecting portion extended integrally from the first embedding portion, the first embedding portion and the first connecting portion have different height, and the first embedding portion is fixed to the first supporting component by embedding molding.

2. The multi-group lens assembly of claim 1, wherein
the first supporting component includes a first main body and an outer extension table extending outwardly from the first main body, the outer extension table has a first outer bottom face, and the first welding part is provided on the first outer bottom face, and
the second supporting component includes a second main body and a supporting table extending from the second main body, the supporting table has an outer top face for supporting the outer extension table of the first supporting component, and the second welding part is provided on the outer top face of the supporting table.

3. The multi-group lens assembly of claim 2, wherein the first welding part and the second welding part are embedded into the first supporting component and the second supporting component, respectively.

4. The multi-group lens assembly of claim 3, wherein the first welding part and the second welding part are implemented to have the same structure.

5. The multi-group lens assembly of claim 3, wherein the first connecting portion forms a first exposed surface.

6. The multi-group lens assembly of claim 5, wherein the second welding part includes a second embedding portion and a second connecting portion connected to the second embedding portion, when the second welding part is embedded into the second supporting component, the second embedding portion is embedded into the second supporting component and the second connecting portion forms a second exposed surface, and the first exposed surface of the first connecting portion and the second exposed surface of the second connecting portion are bonded to each other after the first welding part is welded to the second welding part.

7. The multi-group lens assembly of claim 2, wherein the outer extension table has an upper side face opposite to the first outer bottom face and a welding port, and the welding port extends from the first outer bottom face of the outer extension table to the upper side face of the outer extension table.

8. The multi-group lens assembly of claim 1, wherein
the first supporting component includes a first main body and an outer extension table extending outwardly from the first main body, the outer extension table has a first outer side face, and the first welding part is provided on the first outer side face of the outer extension table, and
the second supporting component includes a second main body and a supporting table extending from the second main body, the supporting table has a second outer side face for supporting the outer extension table of the first supporting component, and the second welding part is provided on the second outer side face of the supporting table.

9. The multi-group lens assembly of claim 8, wherein the supporting table has a third outer side face opposite to the second outer side face and a welding port, and the welding port extends from the second outer side face to the third outer side face.

10. The multi-group lens assembly of claim 8, wherein the first welding part and the second welding part are embedded into the first supporting component and the second supporting component, respectively.

11. The multi-group lens assembly of claim 1, further comprising:
a photosensitive assembly; and
a lens assembly supporting element that is provided on the photosensitive assembly and for supporting at least one of the first group unit or second group unit,
wherein the welding structure further includes at least a third welding part provided on the lens assembly supporting element and that is welded and fixed to at least one of the first welding part or the second welding part.

12. The multi-group lens assembly of claim 11, wherein
each of the first supporting component and the second supporting component has an outer wall,
the first welding part and the second welding part are provided on the outer wall of the first supporting component and the outer wall of the second supporting component, respectively, and
the lens assembly supporting element has an inner wall, and the third welding part is provided on the inner wall of the lens assembly supporting element in a manner by which the third welding part can be welded and fixed to at least one of the first welding part or the second welding part.

13. The multi-group lens assembly of claim 12, wherein the lens assembly supporting element is a driving element.

14. The multi-group lens assembly of claim 11, wherein the welding structure further include at least a fourth welding part provided on the photosensitive assembly and that is welded and fixed to the third welding part.

15. The multi-group lens assembly of claim 1, wherein, the first group unit and the second group unit are aligned before the second welding part is welded and fixed to the first welding part.

16. An optical module, comprising:
a photosensitive assembly; and
the multi-group lens assembly of claim 1 that is provided on the photosensitive assembly.

17. An electronic device, comprising:
a device body; and
the optical module of claim 16 that is mounted to the device body.

18. The multi-group lens assembly of claim 1, wherein the at least one selected from the first welding part or the second welding part is implemented as the enclosed annular shape surrounding an optical axis of the first group lens.

* * * * *